(12) United States Patent
Otake et al.

(10) Patent No.: US 7,697,170 B2
(45) Date of Patent: Apr. 13, 2010

(54) IMAGE PROCESSING APPARATUS AND IMAGE PROCESSING METHOD

(75) Inventors: Ritsuko Otake, Kawasaki (JP); Satoshi Imai, Nakano-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 744 days.

(21) Appl. No.: 11/555,629

(22) Filed: Nov. 1, 2006

(65) Prior Publication Data
US 2007/0133038 A1 Jun. 14, 2007

(30) Foreign Application Priority Data
Dec. 14, 2005 (JP) ............................. 2005-360652

(51) Int. Cl.
H04N 1/40 (2006.01)
(52) U.S. Cl. ...................... 358/3.28; 358/2.1
(58) Field of Classification Search ............... 358/3.28, 358/1.9, 2.1, 1.16; 399/366
See application file for complete search history.

(56) References Cited

U.S. PATENT DOCUMENTS

| 4,579,370 | A | 4/1986 | Corwin et al. |
| 5,479,507 | A | 12/1995 | Anderson |
| 2003/0179399 | A1* | 9/2003 | Matsunoshita ............. 358/1.13 |
| 2005/0058476 | A1 | 3/2005 | Murakami |
| 2005/0078993 | A1 | 4/2005 | Oomura et al. |
| 2005/0088701 | A1 | 4/2005 | Uchida et al. |
| 2005/0190411 | A1 | 9/2005 | Ohno |
| 2005/0232655 | A1 | 10/2005 | Syouichiro |
| 2007/0109585 | A1 | 5/2007 | Tanaka et al. |

FOREIGN PATENT DOCUMENTS

| CN | 1606329 | | 4/2005 |
| EP | 1367811 | | 12/2003 |
| EP | 1528784 | A2 | 5/2005 |
| JP | 06-068051 | U | 9/1994 |
| JP | 06-071156 | U | 10/1994 |
| JP | 2001-334741 | A | 12/2001 |
| JP | 2001-346032 | | 12/2001 |
| JP | 2001-346032 | A | 12/2001 |
| JP | 2004-304597 | A | 10/2004 |
| JP | 2005-057352 | A | 3/2005 |
| JP | 2005-136953 | A | 5/2005 |
| JP | 2005-198250 | A | 7/2005 |
| JP | 2005-231145 | A | 9/2005 |
| JP | 2005-295519 | A | 10/2005 |
| JP | 2006-005399 | A | 1/2006 |
| JP | 2007-142725 | A | 6/2007 |
| WO | WO97/43736 | | 11/1997 |

* cited by examiner

Primary Examiner—Thomas D Lee
Assistant Examiner—Stephen M Brinich
(74) Attorney, Agent, or Firm—Canon USA Inc. IP Division

(57) ABSTRACT

A method for controlling an image processing apparatus includes a determining step of determining, on the basis of a given first area in an original document image, a second area in the original document image that does not overlap with the first area, and a compositing step of combining a first copy-forgery-inhibited pattern image with the first area and combining a second copy-forgery-inhibited pattern image with the second area.

6 Claims, 27 Drawing Sheets

FIG. 11

DITHER MATRIX FOR GENERATING
LATENT-IMAGE PART
(LATENT IMAGE MATRIX)

| 6 | 7 | 8 | 9 |
|---|---|---|---|
| 5 | 0 | 1 | 10 |
| 4 | 3 | 2 | 11 |
| 15 | 14 | 13 | 12 |

FIG. 12

DITHER MATRIX FOR GENERATING
BACKGROUND-IMAGE PART
(BACKGROUND IMAGE MATRIX)

| 0 | 8 | 2 | 10 |
|---|---|---|---|
| 12 | 4 | 14 | 6 |
| 3 | 11 | 1 | 9 |
| 15 | 7 | 13 | 5 |

(a)

(b)

(a)

(b)

(a)

VISUALIZE (b)

IMAGE PROCESSING APPARATUS AND IMAGE PROCESSING METHOD

BACKGROUND OF THE INVENTION

1. Field of the Invention

The present invention relates to an image processing apparatus that can combine a copy-forgery-inhibited pattern image and an original document image and output the composite image.

2. Description of the Related Art

Special paper called anti-forgery paper exists. A character string, for example, "COPY", is embedded in anti-forgery paper so that a human cannot see the character string at a glance. The embedded character string appears clearly on a copy obtained by copying the anti-forgery paper. Thus, a document prepared using such anti-forgery paper can be distinguished from a copy of the document with ease. Furthermore, a person would hesitate to use a copy of the document.

Anti-forgery paper has such effects and thus is used when, for example, a resident card or a form is made. However, a problem exists in that the cost of anti-forgery paper is higher than that of ordinary paper. Furthermore, another problem exists in that only character strings embedded when anti-forgery paper is manufactured appear clearly on a copy of the anti-forgery paper.

In this situation, recently, a new technique has become of interest, in which the same effects as with anti-forgery paper can be achieved. In this technique, original document data and copy-forgery-inhibited-pattern image data created with a computer are combined in a printer, and the composite image data containing copy-forgery-inhibited patterns is output on ordinary paper. Character strings and the like are embedded in this copy-forgery-inhibited pattern image. Thus, the embedded character strings appear clearly on a copy obtained by copying the image containing copy-forgery-inhibited patterns, as in a case where anti-forgery paper is used. In this technique, ordinary paper is used. Thus, an advantage exists in that the cost of making an original using this technique is cheaper than the cost of making an original using anti-forgery paper. Furthermore, in this technique, a new copy-forgery-inhibited pattern image can be created every time an original is made. Thus, this technique has another advantage in that the colors, embedded character strings, and the like of a copy-forgery-inhibited pattern image can be freely set up.

A copy-forgery-inhibited pattern image includes an area that is to remain and the other area that is to disappear (or that is pale compared with the area that is to remain) on a copy of the image. The reflection densities of these two areas on the original are substantially the same. Thus, embedded character strings, for example, "COPY", are illegible to the human eye. Here, the term "remain" means that an image on an original is correctly reproduced on a copy of the original, and the term "disappear" means that an image on an original is not reproduced on a copy of the original.

Hereinafter, an area that is to remain on a copy is called a latent-image part, and the other area that is to disappear (or that is pale compared with the area that is to remain) from a copy is called a background-image part.

FIG. 24 is an illustration showing the state of dots in a copy-forgery-inhibited pattern image. In FIG. 24, an area where dots are concentrated is a latent-image part, and the other area where dots are dispersed is a background-image part. The dots in these two areas are generated by different types of dot processing, different types of dither processing, or the like. For example, the dots in the latent-image part are generated by dot processing with a small number of lines, and the dots in the background-image part are generated by dot processing with a large number of lines. Alternatively, the dots in the latent-image part may be generated using a clustered-dot dither matrix, and the dots in the background-image part may be generated using a dispersed-dot dither matrix.

The reproduction capability of a copying machine depends on the input resolution and output resolution of the copying machine. Thus, there is a limit to the reproduction capability of a copying machine. Accordingly, in general, when the size of each of the dots in the latent-image part of a copy-forgery-inhibited pattern image is larger than the size of a dot that can be reproduced by a copying machine and when the size of each of dots in the background-image part of the copy-forgery-inhibited pattern image is smaller than the size of the dot that can be reproduced by the copying machine, the dots in the latent-image part are reproduced on a copy, and the dots in the background-image part are hardly reproduced. Consequently, the color of the latent-image part reproduced on the copy is deeper than the color of the background-image part. Hereinafter, a term "visualization" represents a process in which an embedded latent image (for example, latent character strings) appears clearly on a copy by reproducing the latent-image part on the copy so that the color of the latent-image part is deeper than the color of the background-image part.

Parts (a) and (b) of FIG. 25 show visualization. Part (a) shows a copy-forgery-inhibited pattern image having not been visualized, and part (b) shows the copy-forgery-inhibited pattern image having been visualized on a copy. FIG. 25 schematically shows that concentrated dots (large dots) are reproduced on a copy, and dispersed dots (small dots) are not correctly reproduced on the copy.

A copy-forgery-inhibited pattern image is not limited to that described above and can take other forms so long as a character string, for example, "COPY", a symbol, a pattern, or the like appears clearly (is visualized) on a copy so that they can be recognized by a human. Even when a character string, for example, "COPY", is inverse-printed on a copy, the purpose can be achieved by this type of copy-forgery-inhibited pattern image. In this case, needless to say, an area that includes the character string "COPY" is called a background-image part.

A technique for generating such a copy-forgery-inhibited pattern image is disclosed in Japanese Patent Laid-Open No. 2001-346032.

However, instructions may be individually submitted from a plurality of users to add to an output image a character string, a symbol, or a pattern that appears clearly on a copy of an original document to which a copy-forgery-inhibited pattern image is added. In this case, when two or more copy-forgery-inhibited patterns are added to the image at the same time, patterns of the individual copy-forgery-inhibited patterns may interfere with each other, and thus the quality of the image may be disadvantageously deteriorated. When the type of copy-forgery-inhibited pattern that is automatically added is limited to one type to avoid this problem, a problem exists in that the output image does not reflect the intention of a user who sends an instruction to add a copy-forgery-inhibited pattern image that is invalidated to the output image. Thus, solutions to these problems are required.

SUMMARY OF THE INVENTION

A method according to an aspect of the present invention for controlling an image processing apparatus includes a determining step of determining, on the basis of a given first area in an original document image, a second area in the original document image that does not overlap with the first area, and a compositing step of combining a first copy-forgery-inhibited pattern image with the first area and combining a second copy-forgery-inhibited pattern image with the second area.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 11 shows an exemplary clustered-dot dither matrix.

FIG. 12 shows an exemplary dispersed-dot dither matrix.

DESCRIPTION OF THE EMBODIMENTS

First Exemplary Embodiment

Figure 1:
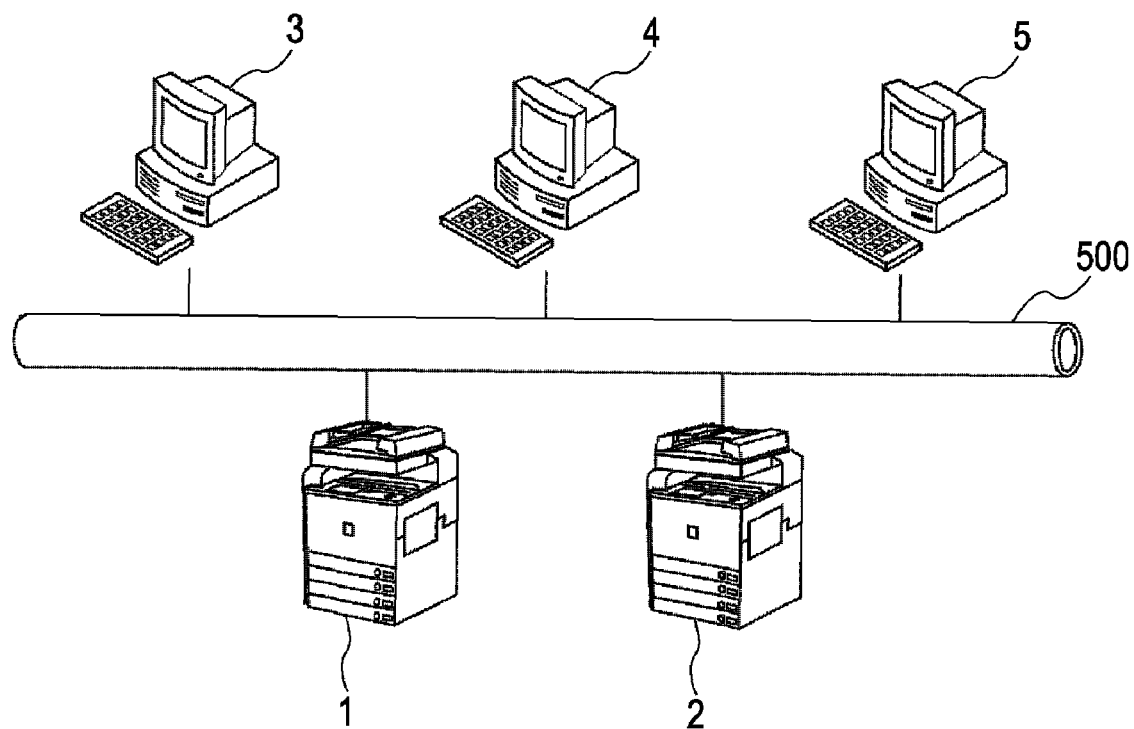
FIG. 1 is a system configuration diagram of a network to which exemplary embodiments can be suitably applied.

FIG. 1 is a system configuration diagram of a system to which exemplary embodiments can be suitably applied.

In FIG. 1, reference numerals 1 and 2 denote digital multi functional printers. The digital multi functional printers 1 and 2 have a copying function of optically reading an image of an original document, converting the read image to digital data (hereinafter, this digital data is also called a copy original-document image or copy original-document image data), and printing the digital data. The digital multi functional printers 1 and 2 further have a function of sending the copy original-document image data to external devices.

The digital multi functional printers 1 and 2 further have a function of printing digital data received from external devices, for example, computers that are described below. Hereinafter, this digital data is also called a page description language (PDL) original-document image or PDL original-document image data.

Reference numerals 3 to 5 denote computers. The computers 3 to 5 have a function of creating and editing PDL original-document image data, converting the PDL original-document image data to the PDL format, and sending the converted data to the digital multi functional printer 1 or 2. These components are connected to a local area network (LAN) 500.

Hereinafter, PDL original-document image data and copy original-document image data are collectively called original-document image data.

Figure 7:
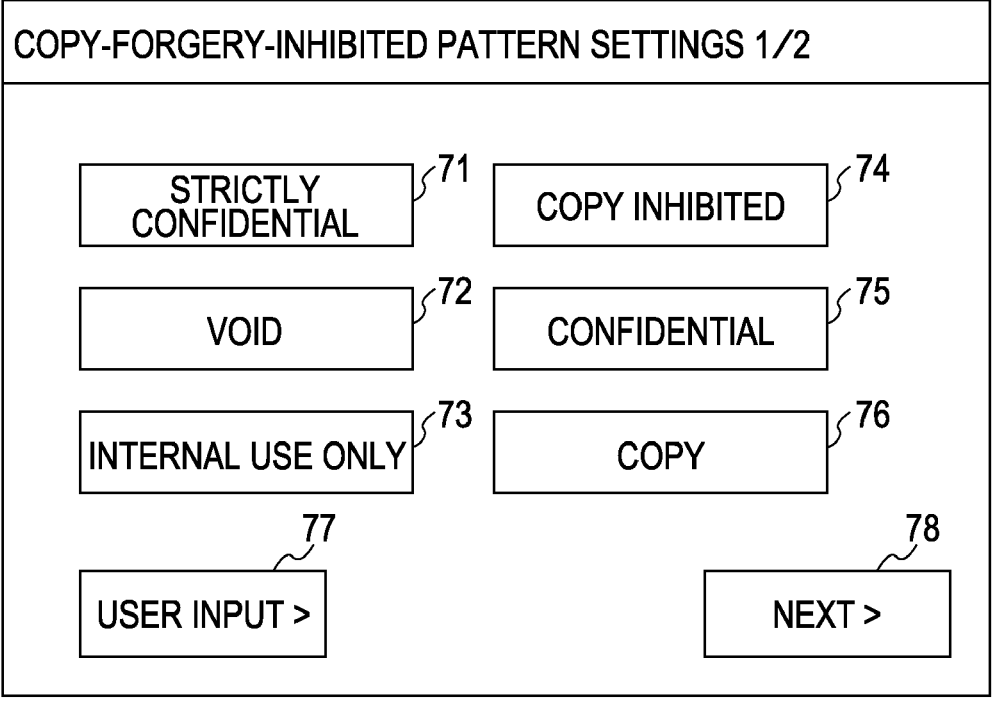
FIG. 7 shows a screen on an operation unit in the digital multi functional printer for specifying a copy-forgery-inhibited pattern character string.
Figure 8:
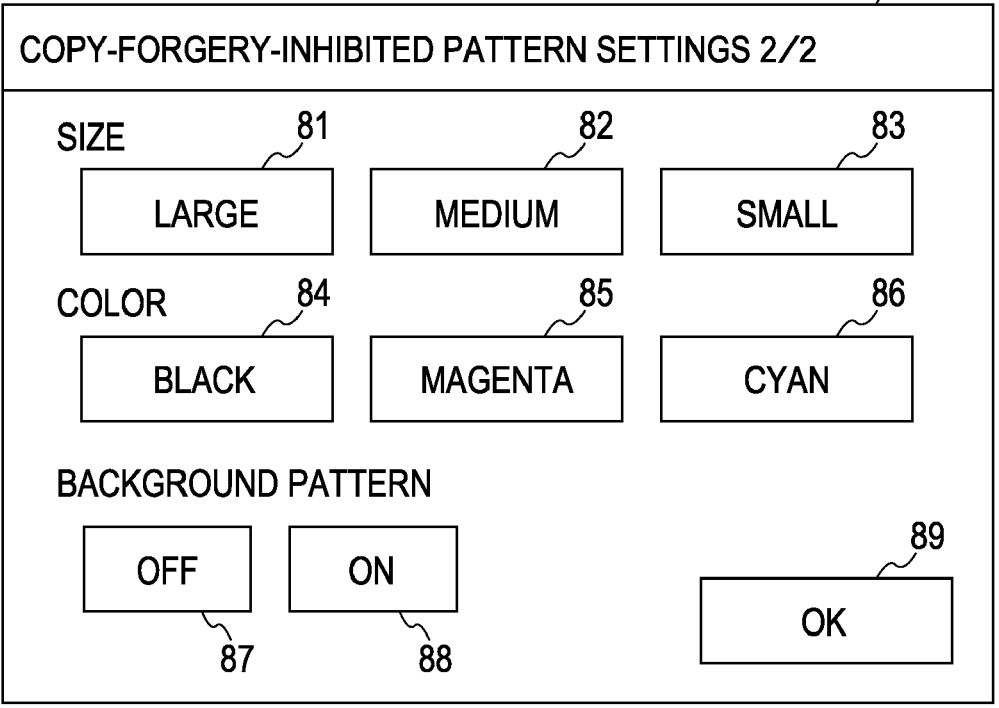
FIG. 8 shows a screen on the operation unit in the digital multi functional printer for configuring detailed copy-forgery-inhibited pattern settings.

In the digital multi functional printers 1 and 2, settings for combining original-document image data and copy-forgery-inhibited-pattern image data can be configured from operation units included in the digital multi functional printers 1 and 2, as described below. Furthermore, detailed settings related to the layout and the like of copy-forgery-inhibited-pattern image data to be combined can be configured, as shown in FIGS. 7 and 8. Hereinafter, copy-forgery-inhibited-pattern image data that is set up from the operation units in the digital multi functional printers 1 and 2 in this way is called copy copy-forgery-inhibited-pattern image data.

The administrator of the digital multi functional printers 1 and 2 can remotely control the digital multi functional printers 1 and 2 through a remote user interface (UI). The administrator can further configure settings of copy-forgery-inhibited-pattern image data. Hereinafter, copy-forgery-inhibited-pattern image data that is set up in this way is also called copy copy-forgery-inhibited-pattern image data.

Figure 9:
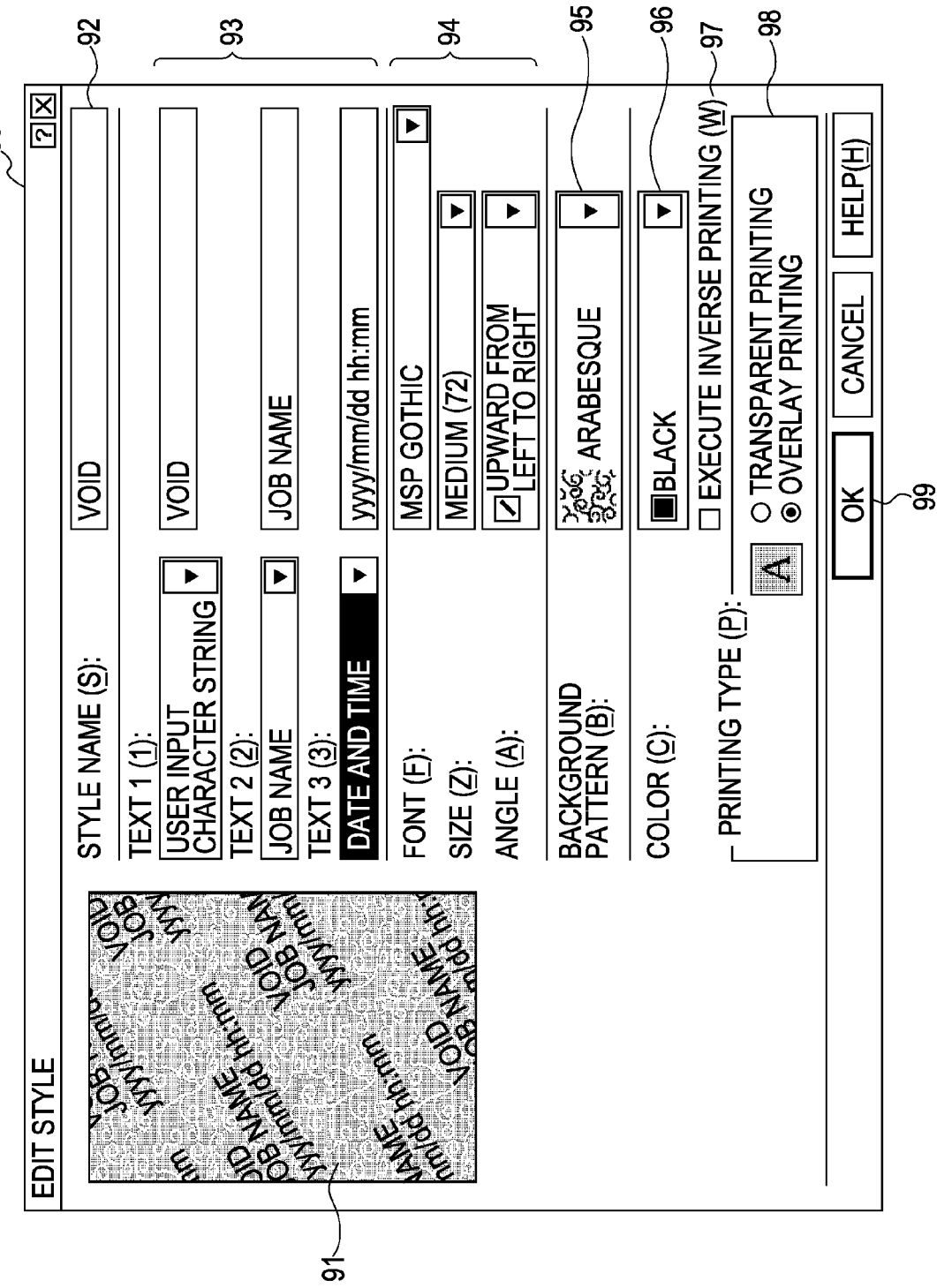
FIG. 9 shows a printer driver screen for configuring detailed copy-forgery-inhibited pattern settings.

In the computers 3 to 5, settings for combining PDL original-document image data and copy-forgery-inhibited-pattern image data can be configured from operation units included in the computers 3 to 5. Furthermore, detailed settings related to the layout and the like of copy-forgery-inhibited-pattern image data to be combined can be configured, as shown in FIG. 9. Hereinafter, copy-forgery-inhibited-pattern image data that is set up from the operation units in the computers 3 to 5 in this way is called PDL copy-forgery-inhibited-pattern image data.

The digital multi functional printers 1 and 2 can combine both PDL copy-forgery-inhibited-pattern image data and copy copy-forgery-inhibited-pattern image data with original-document image data and output the combined data. Needless to say, the digital multi functional printers 1 and 2 can combine one of the foregoing pieces of copy-forgery-inhibited-pattern image data with original-document image data and output the combined data. The structure of the digital multi functional printer 1, out of the digital multi functional printers 1 and 2, will now be described in detail.

Details of Digital Multi Functional Printer

Figure 2:
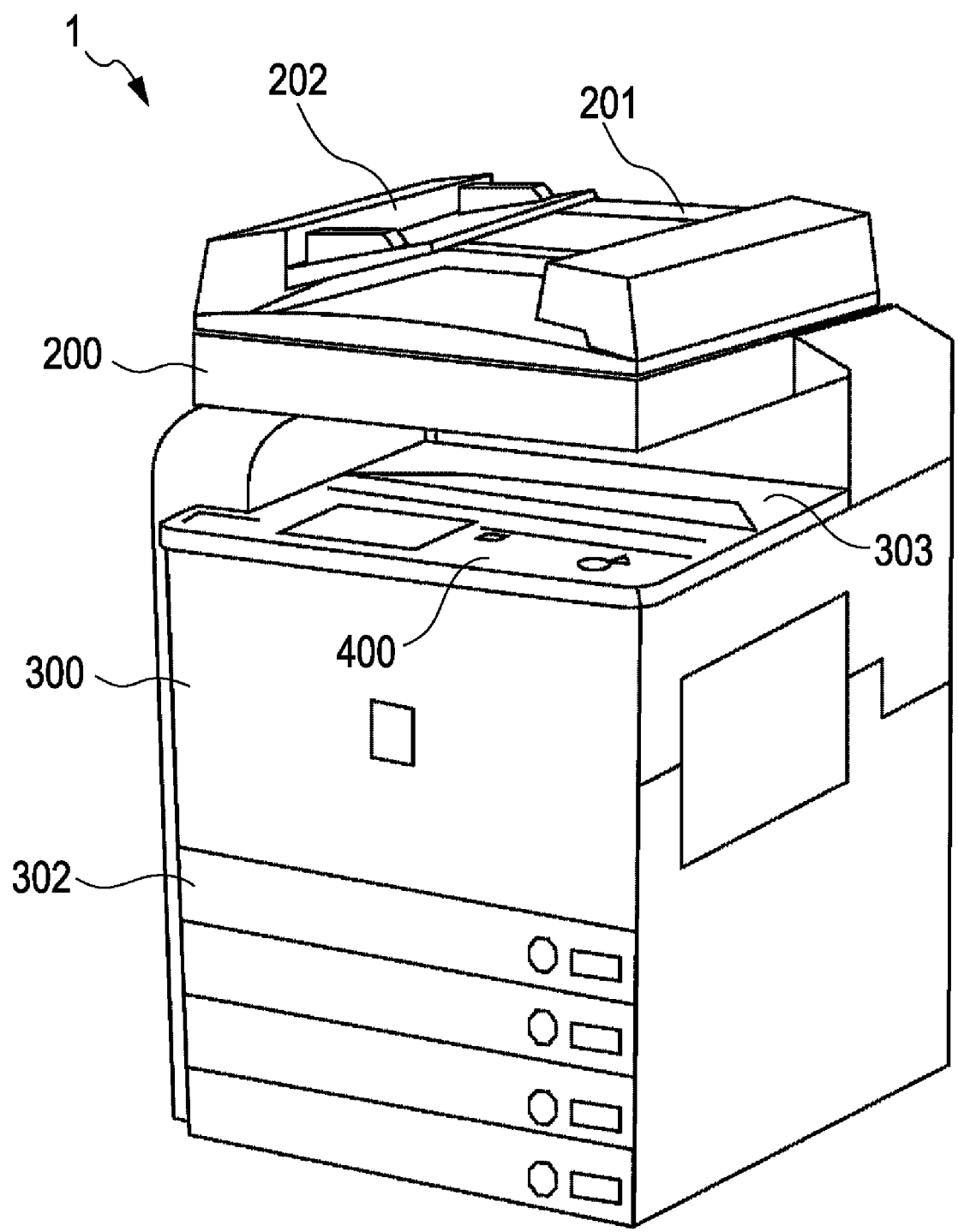
FIG. 2 shows a digital multi functional printer to which the exemplary embodiments can be suitably applied.

FIG. 2 is an external view of the digital multi functional printer 1.

In FIG. 2, a scanner section 200 that is an image input device illuminates an image on paper that is an original document and scans a 3-line charge coupled device (CCD) (not shown) that includes color filters of red (R), green (G), and blue (B). Then, the scanner section 200 converts the obtained electrical charge to electrical signals that represent RGB color image data. Sheets of original documents are set in a tray 202 in a document feeder 201. When a user sends an instruction from an operation unit 400 to start reading, a controller central processing unit (CPU) 103 sends an instruction to the scanner section 200, so that the document feeder 201 feeds the sheets of original documents one by one to read the sheets of original documents.

A printer section 300 that is an image output device converts raster image data to an image on a sheet of paper. A typical printing method is the electrophotographic printing method for fixing toner on paper using, for example, a photoconductor drum or a photoconductor belt, or the ink jet printing method for ejecting ink from a micro nozzle array to print an image directly on a sheet of paper. In the present exemplary embodiment, the printing method is not limited to a specific method. Printing operation is started by an instruction from the controller CPU 103. A paper cassette 302 holds sheets of paper to feed the sheets of paper to a printer. The paper cassette 302 may include a plurality of stacked paper trays so that different paper sizes or different paper orientations can be selected. An output tray 303 receives sheets of paper on which an image has been printed.

Figure 3:
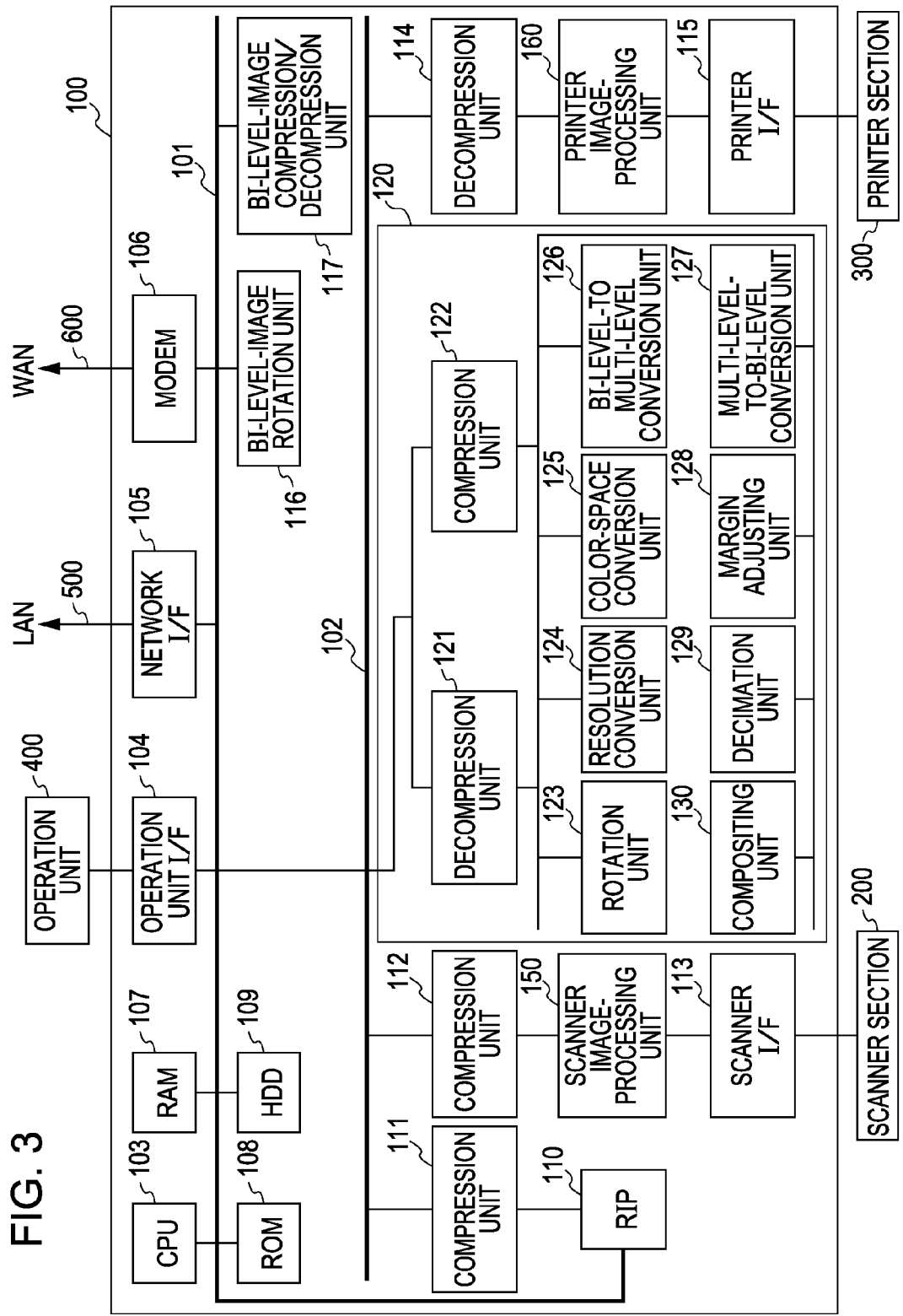
FIG. 3 is a block diagram showing the structure of a controller in the digital multi functional printer to which the exemplary embodiments can be suitably applied.

FIG. 3 is a block diagram showing the detailed structure of a controller 100 in the digital multi functional printer 1.

The controller 100 is electrically connected to the scanner section 200, the printer section 300, and the like. The controller 100 is further connected to the computers 3 to 5 and other external devices via the LAN 500 and a wide area network (WAN) 600. These connections enable input and output of image data, device data, and the like.

The CPU 103 performs overall control of access to various types of device connecting to the controller 100 according to a control program and the like stored in a read only memory (ROM) 108. The CPU 103 further performs overall control of various types of processing in the controller 100. A random access memory (RAM) 107 functions as a system work memory necessary for the CPU 103 to operate and a memory for temporarily storing image data. The RAM 107 includes a static RAM (SRAM) that retains stored data even when the power is turned off and a dynamic RAM (DRAM) from which stored data is erased when the power has been turned off. The ROM 108 stores a boot program of the digital multi functional printer 1 and the like. A hard disk drive (HDD) 109 can store system software, image data, and the like.

An operation unit interface 104 is an interface for connecting the operation unit 400 to a system bus 101. The operation unit interface 104 receives image data to be displayed on the operation unit 400 from the system bus 101 and outputs the image data to the operation unit 400. The operation unit interface 104 also outputs data input from the operation unit 400 to the system bus 101.

A network interface 105 is connected to the LAN 500 and the system bus 101 to input and output data. A modulator-demodulator (MODEM) 106 is connected to the WAN 600 and the system bus 101 to input and output data. A bi-level-image rotation unit 116 transforms the orientation of a bi-level image before it is sent. A bi-level-image compression/decompression unit 117 converts the resolution of a bi-level image before sending to a predetermined resolution or a resolution corresponding to the capacity of the communication partner. Compression and decompression are performed using, for example, the Joint Bi-level Image experts Group (JBIG) method, the Modified Read (MMR) method, the Modified Read (MR) method, or the Modified Huffman (MH) method. An image bus 102 is a transmission path on which image data is transferred and includes a Peripheral Component Interconnect (PCI) bus or an Institute of Electrical and Electronic Engineers (IEEE) 1394 interface.

A scanner image-processing unit 150 receives image data from the scanner section 200 via a scanner interface 113 and corrects, processes, and edits the image data. The scanner image-processing unit 150 determines, for example, whether the received image data is a color document or a monochrome document and whether the image data is a character document or a photographic document. Then, the scanner image-processing unit 150 attaches data of the determination result to the image data. Hereinafter, such incidental data is called attribute flag data. The details of the process in the scanner image-processing unit 150 are described below.

Figure 4:
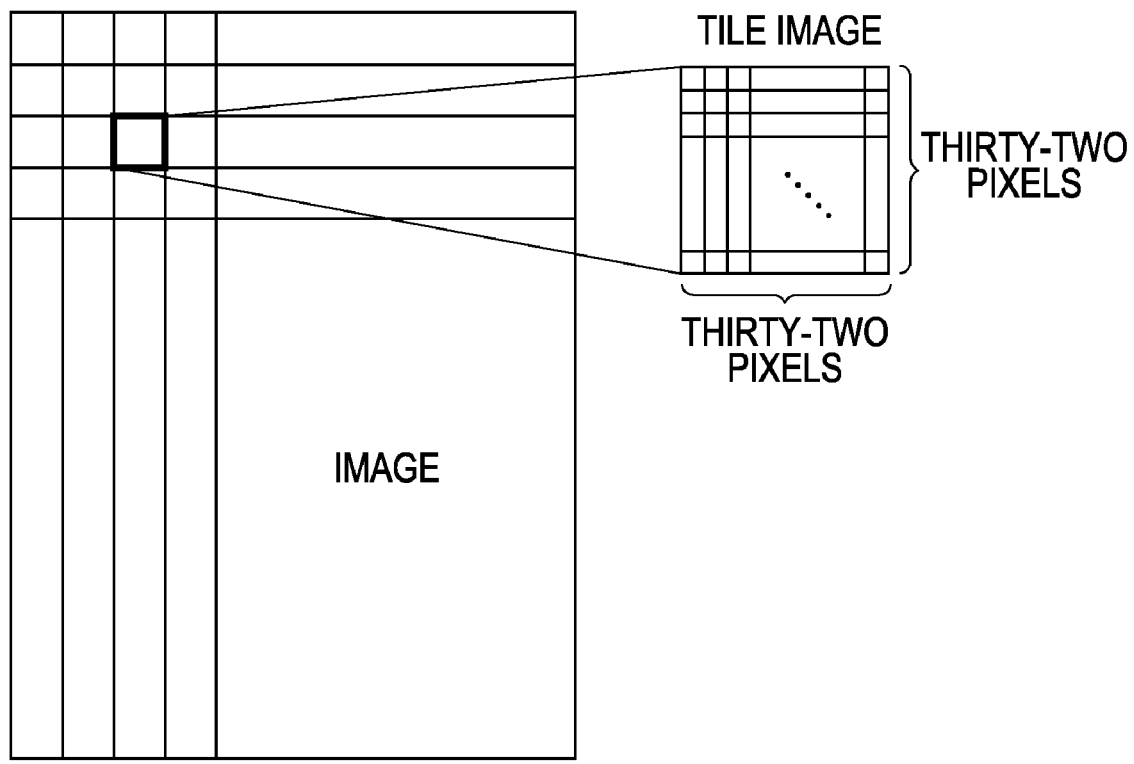
FIG. 4 is a schematic diagram of tile data.

A compression unit 112 receives the image data and divides the image data into blocks each including thirty-two by thirty-two pixels. Hereinafter, such a block of image data including thirty-two by thirty-two pixels is called tile data. FIG. 4 is a schematic diagram of tile data. Hereinafter, an area of an original document (a paper medium having not been read) corresponding to tile data is called a tile image. The average luminance in a tile image including thirty-two by thirty-two pixels, coordinates of the tile image on a corresponding original document, and the like are added to corresponding tile data as the header data. Furthermore, the compression unit 112 compresses image data that includes a plurality of tile images. A decompression unit 114 decompresses the image data, which includes the plurality of tile images, performs raster rendering on the decompressed image data, and then sends the resulting data to a printer image-processing unit 160.

The printer image-processing unit 160 receives the image data sent from the decompression unit 114 and performs image processing on the image data with reference to the attribute flag data attached to the image data. The image data having been subjected to image processing is output to the printer section 300 via a printer interface 115. The details of the process in the printer image-processing unit 160 are described below.

An image conversion section 120 performs predetermined conversion processing on image data and includes processing units described below.

A decompression unit 121 decompresses received image data. A compression unit 122 compresses received image data. A rotation unit 123 rotates received image data. The resolution conversion unit 124 converts the resolution of received image data, for example, from 600 dots per inch (dpi) to 200 dpi. A color-space conversion unit 125 converts the color space of received image data. The color-space conversion unit 125 further performs known background-color elimination, known logarithmic transformation (from RGB to Cyan Magenta Yellow (CMY)), and known output-color correction (from CMY to Cyan Magenta Yellow Black (CMYK)). A bi-level-to-multi-level conversion unit 126 converts received two-gray-level image data to 256-gray-level image data. A multi-level-to-bi-level conversion unit 127 converts received 256-gray-level image data to two-gray-level image data by, for example, the error diffusion method.

A compositing unit 130 combines two received pieces of image data to generate a piece of combined image data by, for example, the following methods. In one method, the average luminance value of each pair of corresponding pixels in the two pieces of image data is calculated as a combined luminance value. In another method, the luminance value of one pixel that has a higher luminance level, out of each pair of corresponding pixels in the two pieces of image data, is set as the luminance value of a corresponding pixel in the composite image data. In this method, the luminance value of one pixel that has a lower luminance level may be set as the luminance value of a corresponding pixel in the composite image data. In yet another method, a logical OR operation, a logical AND operation, or a logical exclusive OR operation is performed on luminance values of each pair of corresponding pixels in the two pieces of image data to determine the luminance value of a corresponding pixel in the composite image data. These compositing methods are generally known. A decimation unit 129 converts the resolution of received image data by decimating pixels in the image data. A margin adjusting unit 128 adds margins to or removes margins from received image data.

A raster image processor (RIP) 110 receives intermediate data generated from PDL code data sent from the computers 3 to 5 or the like and generates multi-level bitmap data.

Figure 5:
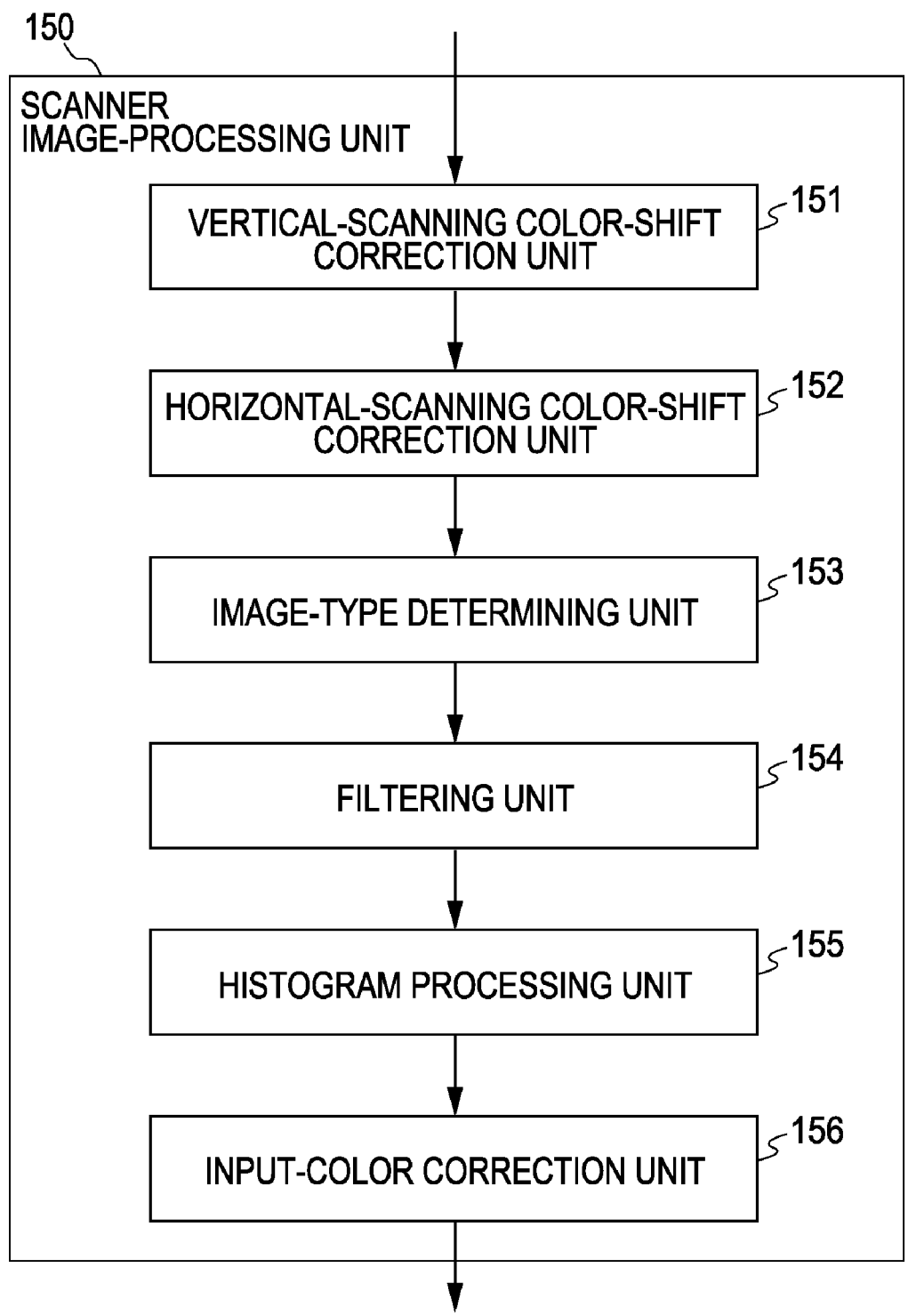
FIG. 5 is a block diagram of a scanner image-processing unit.

FIG. 5 is a block diagram showing the detailed structure of the scanner image-processing unit 150.

Reference numeral 151 denotes a vertical-scanning color-shift correction unit that corrects color shift in original-document image data in the vertical scanning direction. For example, the vertical-scanning color-shift correction unit 151 performs operation using a one-by-five matrix for individual colors of the image data.

Reference numeral 152 denotes a horizontal-scanning color-shift correction unit that corrects color shift in original-document image data in the horizontal scanning direction. For example, the horizontal-scanning color-shift correction unit 152 performs an operation using a five-by-one matrix for individual colors of the image data.

Reference numeral 153 denotes an image-type determining unit that identifies types of image in original-document image data. For example, the image-type determining unit 153 identifies pixels that constitute individual types of image, for example, a picture part or a character part, or a chromatic-color part or an achromatic-color part, in original-document image data and generates attribute flag data that represents a corresponding type for each pixel.

Reference numeral 154 denotes a filtering unit that corrects the spatial frequency of original-document image data as desired. For example, the filtering unit 154 performs an operation using a nine-by-nine matrix.

Reference numeral 155 denotes a histogram processing unit that samples and counts image signals of original-document image data. For example, the histogram processing unit 155 determines whether original-document image data is color image data or monochrome image data or determines the ground level of original-document image data.

Reference numeral 156 denotes an input-color correction unit that corrects colors of original-document image data. For example, the input-color correction unit 156 converts the color space of original-document image data to a predetermined color space.

The scanner image-processing unit 150 according to the present exemplary embodiment may not include some of these components while including another image processing unit. Moreover, the sequence of the processes in these components is not limited to that shown in the drawing.

That is to say, in an image processing apparatus according to the present exemplary embodiment, the scanner image-processing unit 150 includes at least one of the horizontal-scanning color-shift correction unit 152, the vertical-scanning color-shift correction unit 151, the filtering unit 154, and the input-color correction unit 156.

Figure 6:
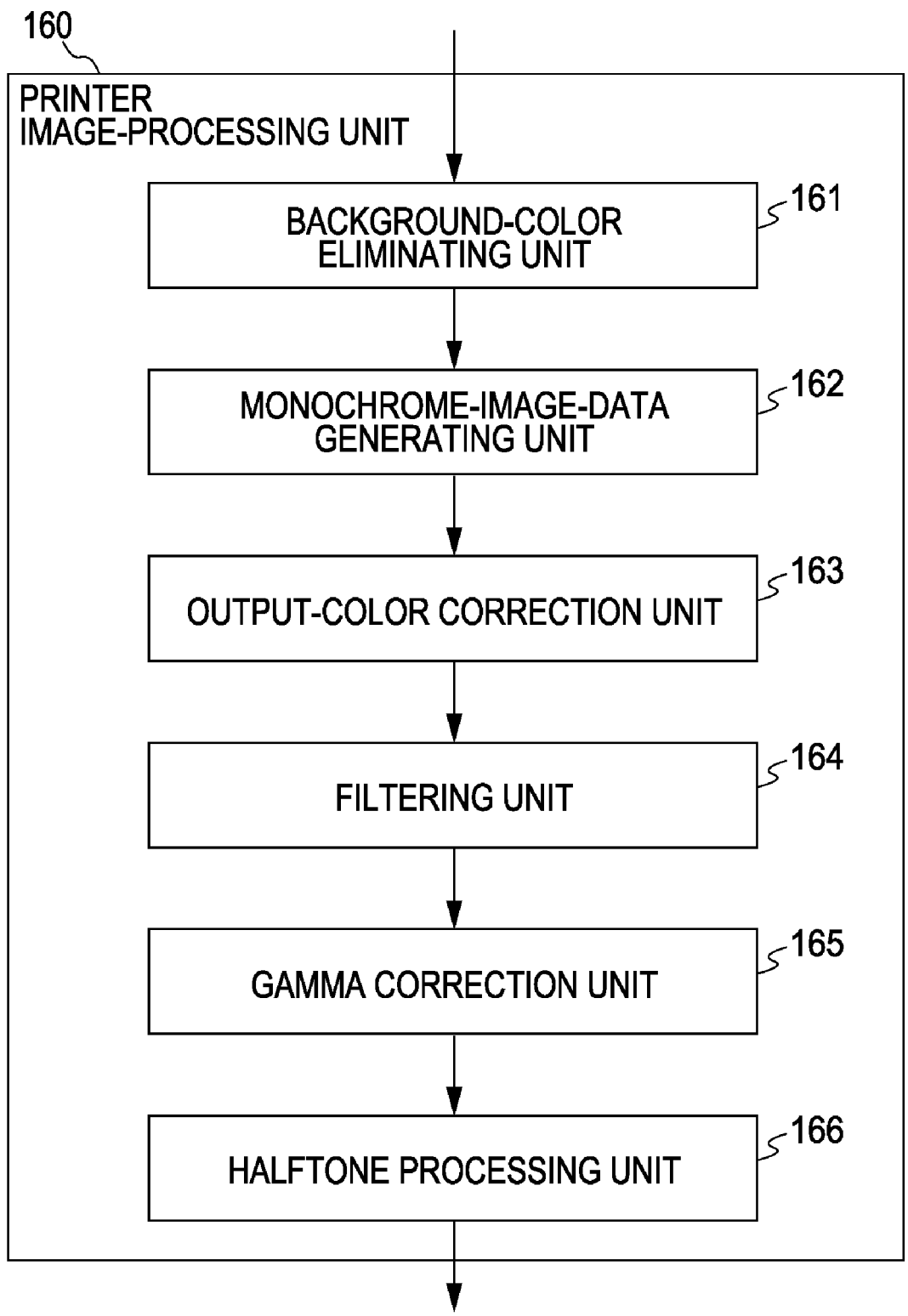
FIG. 6 is a block diagram of a printer image-processing unit.

FIG. 6 is a block diagram showing the detailed structure of the printer image-processing unit 160.

Reference numeral 161 denotes a background-color eliminating unit that eliminates a background color in image data, i.e., unnecessary fog caused by the ground. For example, the background-color eliminating unit 161 performs background-color elimination by performing operation using a three-by-eight matrix or using a one-dimensional look-up table (LUT).

Reference numeral 162 denotes a monochrome-image-data generating unit that converts original color document image data, for example, RGB data, to monochrome image data having, for example, a gray color when the image data is printed in one color. For example, the monochrome-image-data generating unit 162 performs operation using a one-by-three matrix, in which RGB signals are multiplied by a predetermined constant to obtain gray signals.

Reference numeral 163 denotes an output-color correction unit that performs color correction to suit characteristics of the printer section 300, to which original-document image data is output. For example, the output-color correction unit 163 performs operations using a four-by-eight matrix or performs processing by direct mapping.

Reference numeral 164 denotes a filtering unit that corrects the spatial frequency of original-document image data as desired. For example, the filtering unit 164 performs operations using a nine-by-nine matrix.

Reference numeral 165 denotes a gamma correction unit that performs gamma correction to suit characteristics of the printer section 300, to which data is output. In general, a one-dimensional LUT is used for gamma correction.

Reference numeral 166 denotes a halftone processing unit that performs predetermined halftone processing to suit the number of gray levels of the printer section 300, to which data is output. For example, the halftone processing unit 166 performs predetermined screening using, for example, two values or thirty-two values, or error diffusion.

The process performed in the printer image-processing unit 160 is not limited to a process in which all of the aforementioned components are used. Alternatively, some of these components may be omitted, or another image processing module may be added. Moreover, the sequence of the processes in these components is not limited to that shown in the drawing.

That is to say, the image processing apparatus according to the present exemplary embodiment includes the printer section 300, which forms an original document image on a print medium. The printer section 300 includes at least one of the background-color eliminating unit 161, the monochrome-image-data generating unit 162, the output-color correction unit 163, the gamma correction unit 165, and the halftone processing unit 166.

In the following section entitled "Process of Combining Copy Original-Document Image Data with Copy-Forgery-Inhibited-Pattern Image Data", the process of combining copy original-document image data with copy copy-forgery-inhibited-pattern image data or PDL copy-forgery-inhibited-pattern image data will be described. Then, in the section entitled "Process of Combining PDL Original-Document Image Data with Copy-Forgery-Inhibited-Pattern Image Data", the process of combining PDL original-document image data with copy copy-forgery-inhibited-pattern image data or PDL copy-forgery-inhibited-pattern image data will be described.

Process of Combining Copy Original-Document Image Data with Copy-Forgery-Inhibited-Pattern Image Data The process of combining copy original-document image data with copy-forgery-inhibited-pattern image data and forming the resulting image on an output sheet of paper in the digital multi functional printer 1 will now be described. The copy original-document image data is obtained by reading a copy original document, and the copy-forgery-inhibited-pattern image data is generated in a process described below. The CPU 103 performs overall control of execution of the process. The RAM 107 functions as a main memory of the CPU 103, a work area, and the like.

When an instruction has been submitted to combine a copy original document with a copy-forgery-inhibited pattern from an operation panel, the scanner section 200 starts to read the copy original document. The copy original-document image data generated by this reading operation is sent to the scanner image-processing unit 150 and is subjected to predetermined image processing. The copy original-document image data having been subjected to the predetermined image processing is then sent to the compression unit 112 and compressed. The compressed copy original-document image data and corresponding attribute flag data attached to the copy original-document image data are sent to and stored in the RAM 107. The copy original-document image data stored in the RAM 107 includes a plurality of pieces of tile data.

Subsequently, the copy original-document image data stored in the RAM 107 is sent to the decompression unit 121. The decompression unit 121 decompresses the copy original-document image data. The decompressed copy original-document image data is sent to the color-space conversion unit 125. The color-space conversion unit 125 performs background-color elimination, monochrome image data generation, and output-color correction for the copy original-document image data. These processes correspond to the individual processes in the background-color eliminating unit 161, the monochrome-image-data generating unit 162, and the output-color correction unit 163 in FIG. 6. The copy original-document image data having been subjected to these processes is sent to the compression unit 122. The compression unit 122 compresses the copy original-document image data. The compressed copy original-document image data is sent to and stored in the RAM 107.

Figure 10:
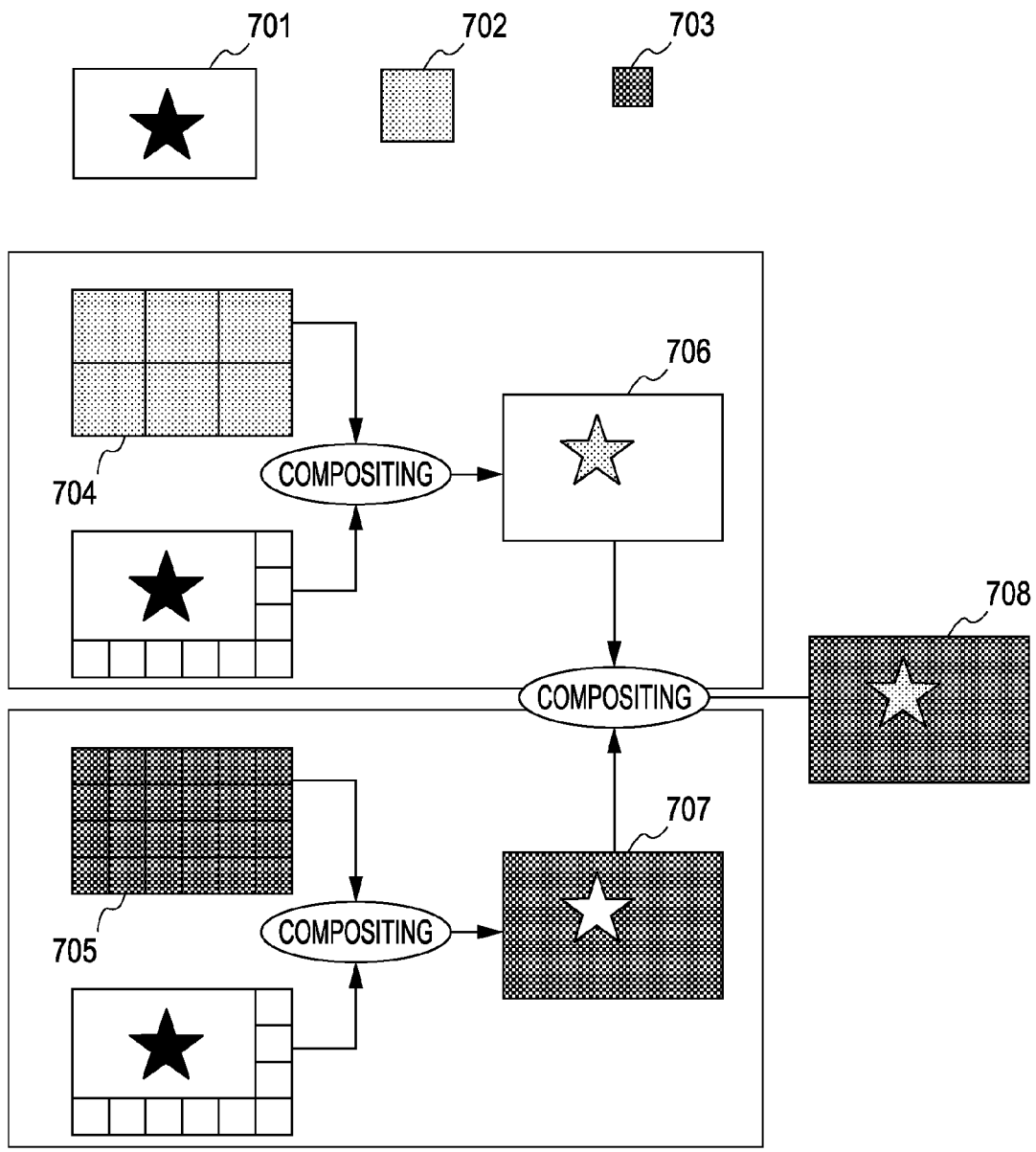
FIG. 10 is an illustration showing the process of generating copy-forgery-inhibited-pattern image data.

On the other hand, corresponding copy-forgery-inhibited-pattern image data generated in the process described below with reference to FIG. 10 is stored in the RAM 107 without being compressed. The copy-forgery-inhibited-pattern image data stored in the RAM 107 includes a plurality of pieces of tile data, as with the copy original-document image data.

Then, the copy original-document image data stored in the RAM 107 is sent to the decompression unit 121. The decompression unit 121 decompresses the copy original-document image data. The decompressed copy original-document image data is sent to the compositing unit 130. Similarly, the copy-forgery-inhibited-pattern image data is sent to the compositing unit 130 via the decompression unit 121. At this time, the decompression unit 121 does not decompress the copy-forgery-inhibited-pattern image data because the copy-forgery-inhibited-pattern image data is not compressed. The compositing unit 130 combines these two pieces of image data together. The two pieces of image data each includes a plurality of pieces of tile data. Thus, the composite image data also includes a plurality of pieces of tile data. The composite image data is sent to the compression unit 122. The compression unit 122 compresses the composite image data. The compressed composite image data is sent to and stored in the RAM 107. Furthermore, the composite image data stored in the RAM 107 is sent to the decompression unit 114. The decompression unit 114 decompresses the composite image data and performs raster rendering on the decompressed composite image data. The composite image data having been subjected to raster rendering is sent to the printer image-processing unit 160.

Then, the printer image-processing unit 160 performs output gamma correction and halftoning on the composite image data. These processes correspond to the individual processes in the gamma correction unit 165 and the halftone processing unit 166 in FIG. 6. On the other hand, the printer image-processing unit 160 does not perform background-color elimination, monochrome image data generation, and output-color correction for the composite image data. These processes correspond to the individual processes in the background-color eliminating unit 161, the monochrome-image-data generating unit 162, and the output-color correction unit 163 in FIG. 6. Background-color elimination and output-color correction are not performed on the composite image data to prevent the copy-forgery-inhibited pattern image from being deformed by these processes. Regarding the copy original-document image data, the color-space conversion unit 125 performs these processes in advance, as described above.

The composite image data having been subjected to the aforementioned processes in the printer image-processing unit 160 is sent to the printer section 300 via the printer interface 115. The printer section 300 forms an image corresponding to the composite image data on an output sheet of paper.

Although omitted in the foregoing description, processing programs stored in the ROM 108 or the HDD 109 or image data stored in the RAM 107 or the HDD 109 can be retrieved as necessary.

Process of Combining PDL Original-Document Image Data with Copy-Forgery-Inhibited-Pattern Image Data A process will now be described, in which PDL original-document image data sent from the computer 3 is received, the received PDL original-document image data is combined with copy-forgery-inhibited-pattern image data generated in the process described below, and the resulting image is formed on an output sheet of paper. The CPU 103 performs overall control of execution of the process. The RAM 107 functions as a main memory of the CPU 103, a work area, and the like. A case will be described, where an instruction is submitted to combine PDL original-document image data generated in the computer 3 with copy-forgery-inhibited-pattern image data. The PDL original-document image data is first sent to the digital multi functional printer 1 in the PDL format.

The digital multi functional printer 1 sends the received PDL original-document image data to the RIP 110 via the MODEM 106 or the network interface 105. The RIP 110 performs rendering on the PDL original-document image data to generate PDL original-document image data in the bitmap format. The generated PDL original-document image data is sent to a compression unit 111 and compressed. The compressed PDL original-document image data and corresponding attribute flag data attached to the PDL original-document image data are sent to and stored in the RAM 107. The PDL original-document image data stored in the RAM 107 includes a plurality of pieces of tile data.

Subsequently, the PDL original-document image data stored in the RAM 107 is sent to the decompression unit 121. The decompression unit 121 decompresses the PDL original-document image data. The decompressed PDL original-document image data is sent to the color-space conversion unit 125. The color-space conversion unit 125 performs background-color elimination, monochrome image data generation, and output-color correction for the PDL original-document image data. These processes correspond to the individual processes in the background-color eliminating unit 161, the monochrome-image-data generating unit 162, and the output-color correction unit 163 in FIG. 6. The PDL original-document image data having been subjected to these processes is sent to the compression unit 122. The compression unit 122 compresses the PDL original-document image data. The compressed PDL original-document image data is sent to and stored in the RAM 107.

On the other hand, corresponding copy-forgery-inhibited-pattern image data generated in the process described below is stored in the RAM 107 without being compressed. The copy-forgery-inhibited-pattern image data stored in the RAM 107 includes a plurality of pieces of tile data, as with the PDL original-document image data.

Then, the PDL original-document image data stored in the RAM 107 is sent to the decompression unit 121. The decompression unit 121 decompresses the PDL original-document image data. The decompressed PDL original-document image data is sent to the compositing unit 130. Similarly, the copy-forgery-inhibited-pattern image data is sent to the compositing unit 130 via the decompression unit 121. At this time, the decompression unit 121 does not decompress the copy-forgery-inhibited-pattern image data because the copy-forgery-inhibited-pattern image data is not compressed. The compositing unit 130 combines these two pieces of image data together. The two pieces of image data each includes a plurality of pieces of tile data. Thus, the composite image data also includes a plurality of pieces of tile data. The composite image data is sent to the compression unit 122. The compression unit 122 compresses the composite image data. The compressed composite image data is sent to and stored in the RAM 107. Furthermore, the composite image data stored in the RAM 107 is sent to the decompression unit 114. The decompression unit 114 decompresses the composite image data and performs raster rendering on the decompressed composite image data. The composite image data having been subjected to raster rendering is sent to the printer image-processing unit 160.

Then, the printer image-processing unit 160 performs output gamma correction and halftoning on the composite image data. These processes correspond to the individual processes in the gamma correction unit 165 and the halftone processing unit 166 in FIG. 6. On the other hand, the printer image-processing unit 160 does not perform background-color elimination, monochrome image data generation, and output-color correction for the composite image data. These processes correspond to the individual processes in the background-color eliminating unit 161, the monochrome-image-data generating unit 162, and the output-color correction unit 163 in FIG. 6. Background-color elimination and output-color correction are not performed on the composite image data to prevent the copy-forgery-inhibited pattern image from being deformed by these processes. Regarding the PDL original-document image data, the color-space conversion unit 125 performs these processes in advance, as described above.

The composite image data having been subjected to the aforementioned processes in the printer image-processing unit 160 is sent to the printer section 300 via the printer interface 115. The printer section 300 forms an image corresponding to the composite image data on an output sheet of paper.

Although omitted in the foregoing description, processing programs stored in the ROM 108 or the HDD 109 or image data stored in the RAM 107 or the HDD 109 can be retrieved as necessary.

Detailed Settings of Copy Copy-Forgery-Inhibited-Pattern Image Data and Generation Process FIGS. 7 and 8 show exemplary screens that appear on the operation unit 400 in the digital multi functional printer 1. These screens are used to configure settings of copy-forgery-inhibited pattern printing.

FIG. 7 shows a first copy-forgery-inhibited pattern setting screen 70 for specifying a latent image (a latent character string) that appears on the operation unit 400 in the digital multi functional printer 1. A user can specify one of "STRICTLY CONFIDENTIAL", "VOID", "INTERNAL USE ONLY", "COPY INHIBITED", "CONFIDENTIAL", and "COPY" by selecting one of character-string specify buttons 71 to 76 on the screen. When the user specifies a user-desired character string instead of a predetermined character string, the user presses a user input button 77 to go to a user input screen. Then, the user can input the user-desired character string on the user input screen. In this exemplary embodiment, the user selects one of a plurality of character strings. Alternatively, the user may select one of a plurality of predetermined symbols. When the user presses a next button 78 upon specifying a character string or a symbol, the user goes to a second copy-forgery-inhibited pattern setting screen 80.

FIG. 8 shows the second copy-forgery-inhibited pattern setting screen 80. The user sets the font size of a latent image (a latent character string) and the color of a copy-forgery-inhibited pattern image on the second copy-forgery-inhibited pattern setting screen 80. The user specifies one of large, medium, and small sizes by selecting one of font-size specify buttons 81 to 83. The user specifies one of black, magenta, and cyan as the color of a copy-forgery-inhibited pattern image by selecting one of color specify buttons 84 to 86. The user selects an ON button 88 or an OFF button 87 to select an option for a background pattern. When the user selects the ON button 88, a camouflage pattern is used to render a latent image illegible to the human eye. When the user presses an OK button 89 upon completing the settings, copy-forgery-inhibited pattern setting is completed.

The details of the process of generating copy copy-forgery-inhibited-pattern image data will now be described with reference to FIG. 10. The CPU 103 performs overall control of execution of the process. The RAM 107 functions as a main memory of the CPU 103, a work area, and the like.

Three types of bitmap data are first generated from latent image data specified by the user. A symbol pattern 701 is first bitmap data generated from character string data or symbol data.

Then, a latent-image pattern 702 and a background-image pattern 703 that are respectively second bitmap data and third bitmap data are generated by the dithering method.

Herein, a latent image represents a character string or an image included in a copy-forgery-inhibited pattern image, which is set by the user. Alternatively, a latent image may represent an image that appears clearly on a copy of a document on which a copy-forgery-inhibited pattern image is formed. As a further alternative, a latent image may represent the symbol pattern 701. As a yet further alternative, a latent image may represent the latent-image pattern 702 or the background-image pattern 703.

Figure 13:
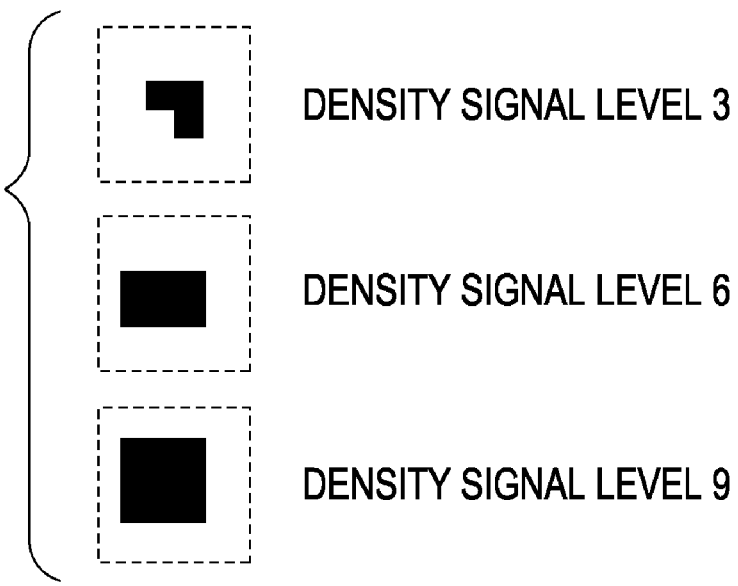
FIG. 13 shows an exemplary clustered dither pattern.
Figure 14:
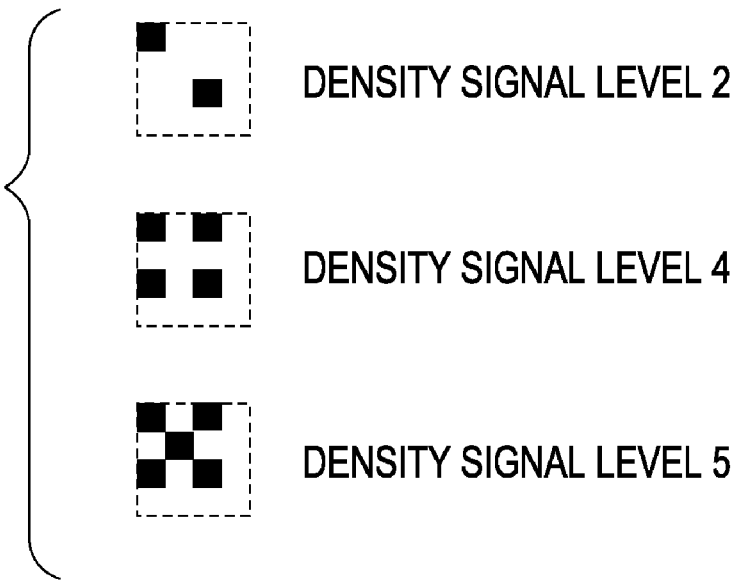
FIG. 14 shows an exemplary dispersed dither pattern.

Although the dithering method is a known method, an exemplary dithering process will now be briefly described with reference to FIGS. 11 to 14, in which a four-by-four clustered-dot dither matrix and a four-by-four dispersed-dot dither matrix are used. FIG. 11 shows a four-by-four clustered-dot dither matrix that is a dither matrix (hereafter, called a latent image matrix) for generating a latent-image part. FIG. 12 shows a four-by-four dispersed-dot dither matrix that is a dither matrix (hereinafter, called a background image matrix) for generating a background-image part. FIG. 13 shows dot patterns generated by individually applying density signal values of three, six, and nine to the clustered-dot dither matrix shown in FIG. 11. From FIGS. 11 and 13, in each dot pattern, it is seen that dots appear, i.e., dots are turned on, in the positions of pixels having values in the clustered-dot dither matrix less than the corresponding applied density signal value. Similarly, FIG. 14 shows dot patterns generated by individually applying density signal values of two, four, and five to the dispersed-dot dither matrix shown in FIG. 12. From FIGS. 13 and 14, it is seen that each dot pattern in FIG. 13 is a clustered dot pattern and each dot pattern in FIG. 14 is a dispersed dot pattern.

Returning to the description of the process of generating the latent-image pattern 702 and the background-image pattern 703, a latent image matrix and density signal values to be applied to the latent image matrix for generating a latent-image part are stored in the HDD 109 in advance. A background image matrix and density signal values to be applied to the background image matrix for generating a background-image part are also stored in the HDD 109 in advance.

When the latent-image pattern 702 is generated, the latent image matrix and the density signal values for generating a latent-image part are read from the HDD 109. The density signal values for generating a latent-image part are applied to the latent image matrix. Then, the latent-image pattern 702 is generated. Similarly, the background-image pattern 703 is generated.

Then, generation of the latent-image pattern 702 is repeated predetermined times to build up a pattern (corresponding to a repeated latent-image pattern 704 shown in FIG. 10) that has approximately the same size as an original document image. Furthermore, generation of the background-image pattern 703 is repeated predetermined times to build up a pattern (corresponding to a repeated background-image pattern 705 shown in FIG. 10) that has approximately the same size as the original document image. Then, latent image data 706 is generated from the repeated latent-image pattern 704 and the symbol pattern 701, and background image data 707 is generated from the repeated background-image pattern 705 and the symbol pattern 701. Then, the latent image data 706 and the background image data 707 are combined to generate copy copy-forgery-inhibited-pattern image data 708. The copy copy-forgery-inhibited-pattern image data 708 is two-level bitmap data to which the color data of one of CMK is attached. The color data may be determined from user-defined settings or the color data of corresponding original-document image data.

In the present exemplary embodiment, the dithering method is used to generate copy copy-forgery-inhibited-pattern image data. However, in the present invention, the method for generating copy copy-forgery-inhibited-pattern image data is not limited to the dithering method. For example, the error diffusion method or the average density approximation may be used to generate the background-image pattern 703.

Detailed Settings of PDL Copy-Forgery-Inhibited-Pattern Image Data and Generation Process FIG. 9 shows an exemplary printer driver screen of the computer 3. The printer driver screen is used to configure copy-forgery-inhibited pattern print settings.

In a window 90 for editing copy-forgery-inhibited pattern data shown in FIG. 9, print settings of individual styles of copy-forgery-inhibited patterns that are registered in advance can be configured in detail. Reference numeral 91 denotes an area for previewing a copy-forgery-inhibited pattern image. Reference numeral 92 denotes an area for displaying the name of a style that is currently selected. Reference numeral 93 denotes an area for displaying and editing a latent image (a latent character string). In the present exemplary embodiment, three types of character string can be specified. Reference numeral 94 denotes an area for displaying and editing the font of the latent image (the latent character string). In the present exemplary embodiment, the font type, the font size, and the angle of the character string can be specified. However, font family information, for example, bold or italic, or ornamental writing information may be additionally displayed. Reference numeral 95 denotes an area for specifying a camouflage pattern for rendering the latent image (the latent character string) illegible to the human eye. The user can select one pattern from among a plurality of camouflage patterns. The user need not use a camouflage pattern. Reference numeral 96 denotes an area for displaying and editing the color of the copy-forgery-inhibited pattern image. Reference numeral 97 denotes a check box for interchanging a latent-image part and a background-image part. Reference numeral 98 denotes radio buttons for selecting the printing sequence of the copy-forgery-inhibited pattern image and the original document image. When the user presses an OK button 99 upon completing the settings, copy-forgery-inhibited pattern print setting is completed.

The process of generating PDL copy-forgery-inhibited-pattern image data is similar to the process of generating copy copy-forgery-inhibited-pattern image data. In the process of generating PDL copy-forgery-inhibited-pattern image data, the copy-forgery-inhibited pattern print settings configured in the computer 3 are sent from the computer 3 to the digital multi functional printer 1. Then, the digital multi functional printer 1 performs a process similar to the generation process described in the section entitled "Detailed Settings of Copy Copy-Forgery-Inhibited-Pattern Image Data and Generation Process" on the basis of the PDL copy-forgery-inhibited-pattern print settings to generate PDL copy-forgery-inhibited-pattern image data.

However, the present invention is not limited to this arrangement. For example, generation, in addition to setting, of PDL copy-forgery-inhibited-pattern image data may be performed in the computer 3. In this case, a CPU included in the computer 3 performs overall control of the process of generating PDL copy-forgery-inhibited-pattern image data.

Process of Combining Multiple Pieces of Copy-Forgery-Inhibited-Pattern Image Data with Original-Document Image Data In the system according to the present exemplary embodiment, more than one method exists, as described above, for combining original-document image data with copy-forgery-inhibited-pattern image data (copy copy-forgery-inhibited-pattern image data and PDL copy-forgery-inhibited-pattern image data). Thus, the settings may be configured so that original-document image data is combined with multiple pieces of copy-forgery-inhibited-pattern image data.

A user A who is an administrator of the digital multi functional printer 1 may configure the settings in the administrator mode so that original-document image data is always combined with copy copy-forgery-inhibited-pattern image data when an image is generated from the original-document image data in the digital multi functional printer 1. Hereinafter, such settings are called forced copy-forgery-inhibited pattern settings.

In this case, it is assumed that a user B who does not know that forced copy-forgery-inhibited pattern settings are configured configures the settings on the printer driver screen so that PDL original-document image data generated in the computer 3 is combined with PDL copy-forgery-inhibited-pattern image data and the composite data is output.

Then, the compositing unit 130 combines first copy-forgery-inhibited-pattern image data (for example, PDL copy-forgery-inhibited-pattern image data), second copy-forgery-inhibited-pattern image data (for example, copy copy-forgery-inhibited-pattern image data), and original-document image data to generate composite image data. The process after generating the composite image data is similar to that described above.

When the composite image data is generated, a logical OR operation should be performed. In a logical OR operation, the value of each pixel in original-document image data and the values of corresponding pixels in multiple pieces of copy-forgery-inhibited-pattern image data are compared with each other, and the maximum pixel value is determined as being the value of a corresponding pixel in the composite image. A logical OR operation should be performed because, when the value of each pixel in original-document image data and the values of corresponding pixels in multiple pieces of copy-forgery-inhibited-pattern image data are added up in the process of generating composite image data, the value of a corresponding pixel in the composite image data is high. When the value of each pixel in composite image data is high, the composite image is much darker than expected.

Figure 15:
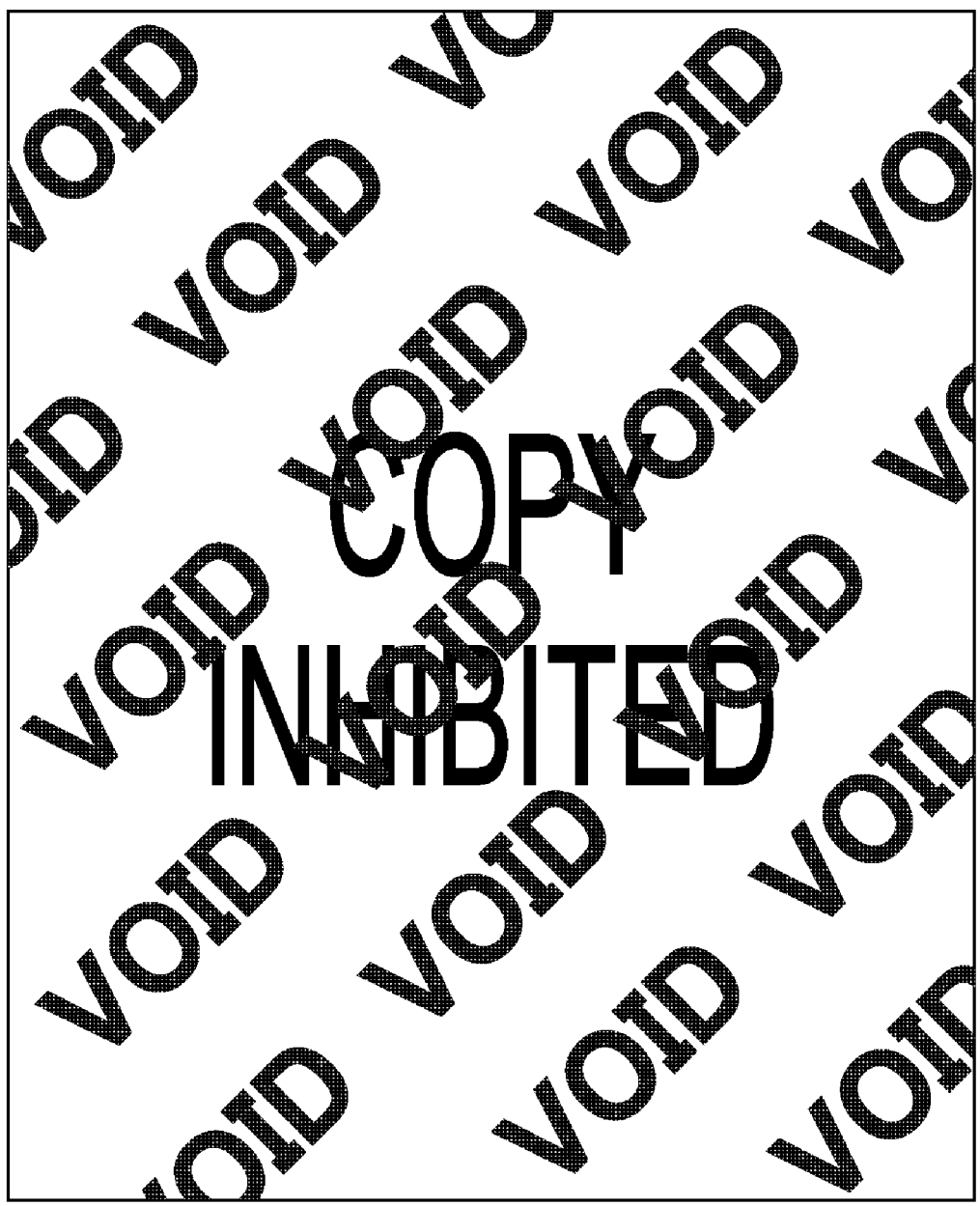
FIG. 15 shows an exemplary copy of an image to which two types of copy-forgery-inhibited pattern are added.

In the present exemplary embodiment, an output document that reflects the intention of more than one user can be obtained by combining multiple pieces of copy-forgery-inhibited-pattern image data with original-document image data, as described above. For example, an output document with which copy-forgery-inhibited pattern images that reflect the intention of more than one user are combined can be obtained by combining first copy-forgery-inhibited-pattern image data (a latent character string "COPY INHIBITED"), second copy-forgery-inhibited-pattern image data (a latent character string "VOID"), and original-document image data (blank image data). FIG. 15 shows a copy of the output document.

Second Exemplary Embodiment

In the first exemplary embodiment, an output document with which copy-forgery-inhibited pattern image data that reflects the intention of more than one user is combined can be obtained by combining multiple pieces of copy-forgery-inhibited-pattern image data and original-document image data. In this case, a copy-forgery-inhibited pattern image needs to be formed so that the size of each of dots in the latent-image part is larger than the size of a dot that can be reproduced by a copying machine, and the size of each of dots in the background-image part is smaller than the size of the dot that can be reproduced by the copying machine.

Now it is assumed that an output document is generated by combining multiple pieces of copy-forgery-inhibited-pattern image data with original-document image data in a simple manner as in the first exemplary embodiment. In this case, dots in a first copy-forgery-inhibited pattern image may be adjacent to dots in a second copy-forgery-inhibited pattern image on the output document, and thus the generated dots may substantially become larger. That is to say, all of the generated dots may be larger than a dot that can be reproduced. When this is the case, the latent image (a latent character string, for example, "VOID") is not visualized on a copy of the output document.

In view of this problem, a second exemplary embodiment is different from the first exemplary embodiment in that an area of an original document image with which a first copy-forgery-inhibited pattern image is combined is not combined with a second copy-forgery-inhibited pattern image. This ensures that the latent image is reliably visualized on a copy of the resulting output document. Consequently, an output document with which copy-forgery-inhibited pattern images that reflect the intention of more than one user are combined can be obtained.

Figure 16:
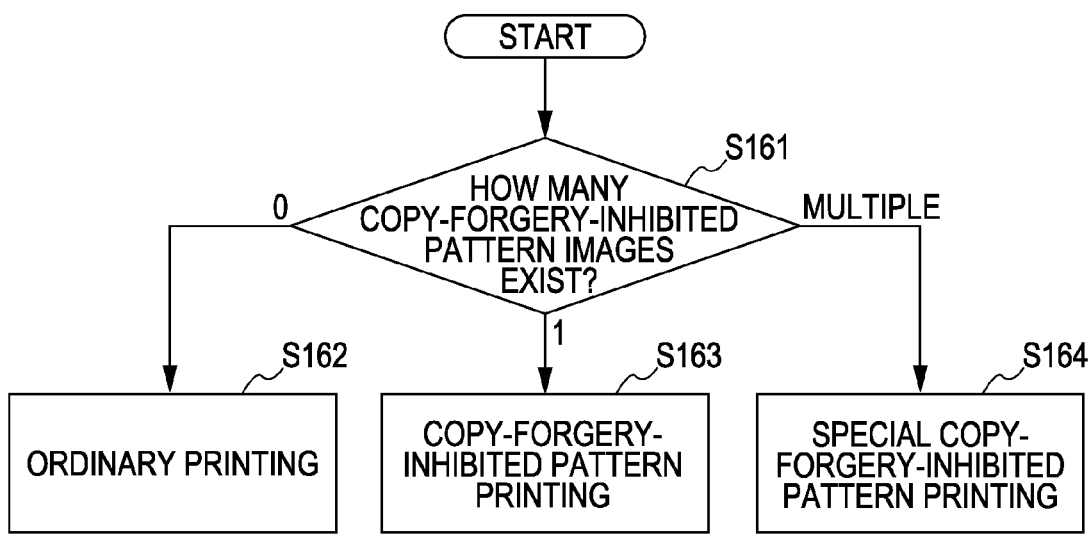
FIG. 16 is a flowchart showing the process in a second exemplary embodiment.

FIG. 16 is a flowchart showing the process in the second exemplary embodiment. The CPU 103 performs overall control of execution of steps in the flowchart. The RAM 107 functions as a main memory of the CPU 103, a work area, and the like. The steps in the flowchart are performed before image compositing is performed in the compositing unit 130.

In step S161, it is determined on the basis of the settings how many copy-forgery-inhibited pattern images are to be combined. When it is determined that no copy-forgery-inhibited pattern image is to be combined, the process proceeds to step S162. When it is determined that a copy-forgery-inhibited pattern image is to be combined, the process proceeds to step S163. When it is determined that multiple copy-forgery-inhibited pattern images are to be combined, the process proceeds to step S164.

In step S162, ordinary printing is performed.

In step S163, copy-forgery-inhibited pattern printing is performed, in which a copy-forgery-inhibited pattern image and an original document image are combined to output a composite image. For example, the process described in the section entitled "Process of Combining PDL Original-Document Image Data with Copy-Forgery-Inhibited-Pattern Image Data" may be performed. Alternatively, the process described in the section entitled "Process of Combining Copy Original-Document Image Data with Copy-Forgery-Inhibited-Pattern Image Data" may be performed.

In step S164, special copy-forgery-inhibited pattern printing is performed, in which multiple copy-forgery-inhibited pattern images and an original document image are combined to output a composite image.

In step S164, the process in the compositing unit 130 is different from the process described in the section entitled "Process of Combining PDL Original-Document Image Data with Copy-Forgery-Inhibited-Pattern Image Data". The process described in the section entitled "Process of Combining Multiple Pieces of Copy-Forgery-Inhibited-Pattern Image Data with Original-Document Image Data" is performed in the compositing unit 130.

When special copy-forgery-inhibited pattern printing is performed, the compositing unit 130 divides the entire area of an original document image into a plurality of areas and assigns the individual areas to multiple copy-forgery-inhibited pattern images as areas for combining the individual copy-forgery-inhibited pattern images with the original document image. Then, the compositing unit 130 combines the multiple copy-forgery-inhibited pattern images with the original document image according to the area assignment to output a composite image.

Specifically, for example, an area of each copy-forgery-inhibited pattern image corresponding to the assigned area of the original document image is cut out, and the cut-out image is combined with the original document image. In this case, it is assumed that the size of each copy-forgery-inhibited pattern image is substantially the same as the size of the original document image (refer to FIG. 10).

Alternatively, when each copy-forgery-inhibited pattern image is generated, only a necessary part of the copy-forgery-inhibited pattern image may be generated in advance instead of generating the whole part of the copy-forgery-inhibited pattern image having the same size as the original document image. When only a necessary part of each copy-forgery-inhibited pattern image is generated, the following process is performed. The individual areas of the original document image are first assigned to the individual copy-forgery-inhibited pattern images. Then, when each copy-forgery-inhibited pattern image is generated, the latent-image pattern 702 and the background-image pattern 703 are generated repeatedly to build up the repeated latent-image pattern 704 and the repeated background-image pattern 705 having the same size as the assigned area. The process after this process is similar to that shown in FIG. 10. In this way, each copy-forgery-inhibited pattern image corresponding to the assigned area can be generated. This also applies to third to sixth exemplary embodiments.

Figure 17:
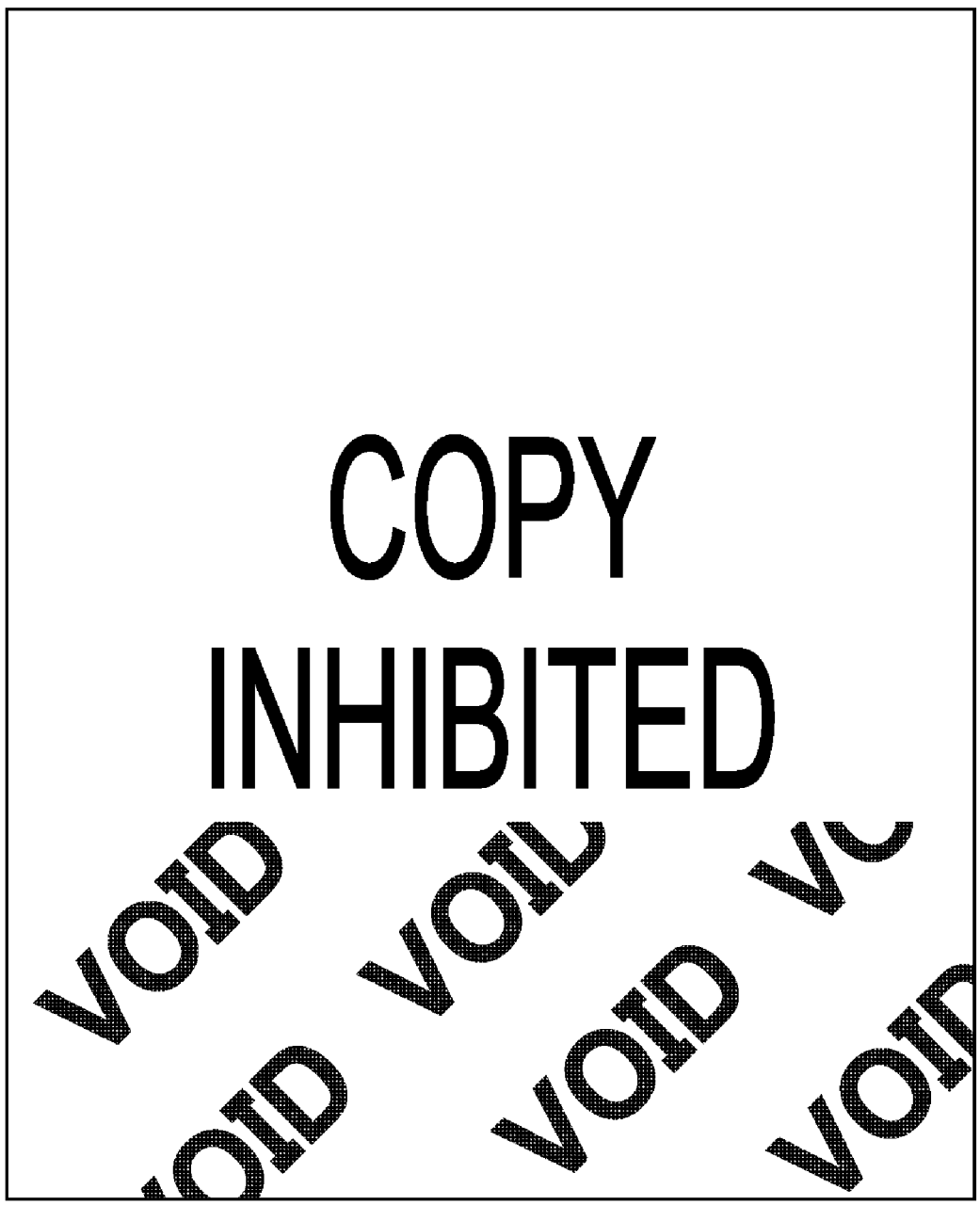
FIG. 17 shows a first exemplary image that includes two separate copy-forgery-inhibited pattern areas.

In a first exemplary compositing method, the top area of an original document image is assigned to first copy-forgery-inhibited-pattern image data (a latent character string "COPY INHIBITED"), and the bottom area of the original document image is assigned to second copy-forgery-inhibited-pattern image data (a latent character string "VOID"). Then, these pieces of copy-forgery-inhibited-pattern image data are combined with the original-document image data (blank image data) to generate an output document. FIG. 17 shows a copy of the output document.

Figure 18:
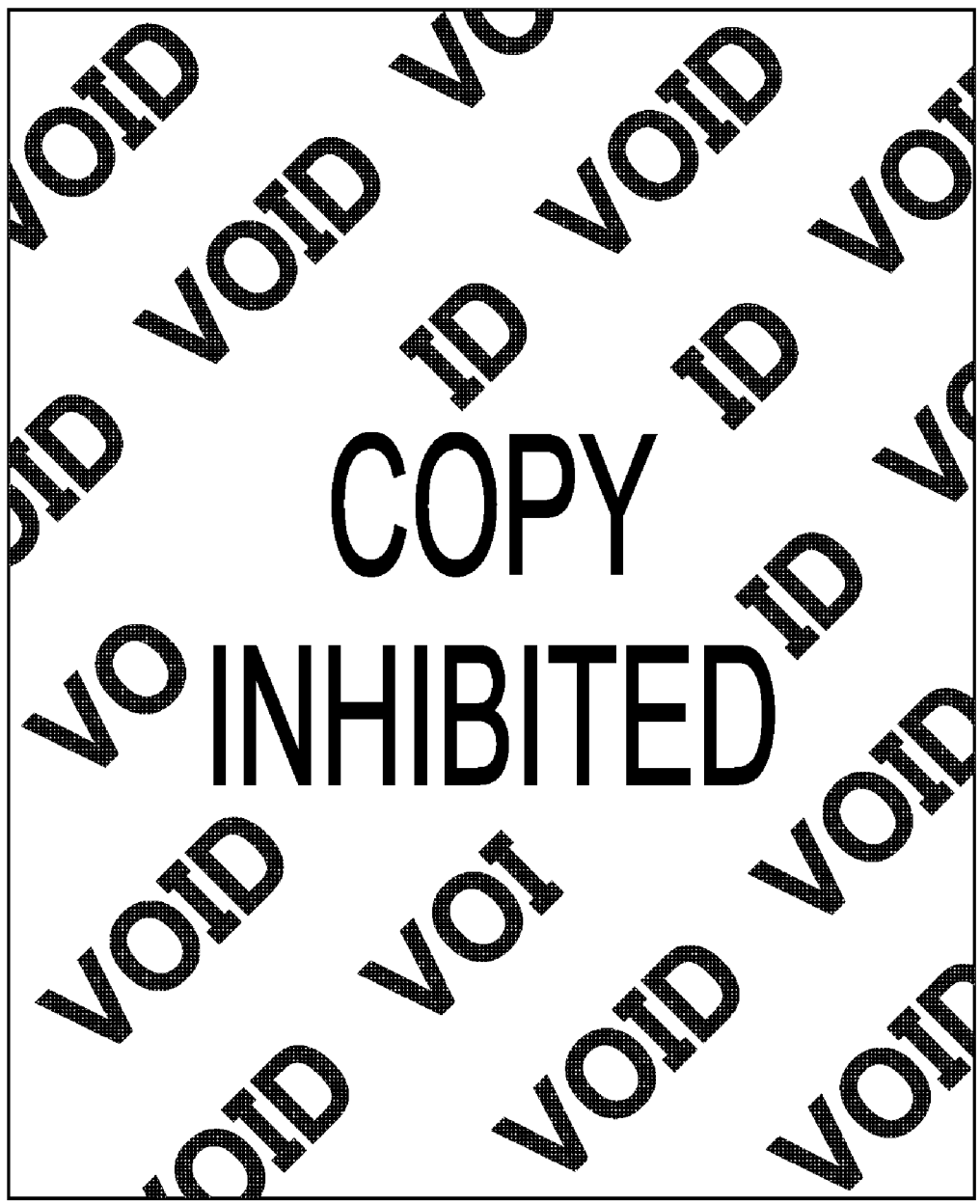
FIG. 18 shows a second exemplary image that includes two separate copy-forgery-inhibited pattern areas.

In a second exemplary compositing method, the center area of an original document image is assigned to first copy-forgery-inhibited-pattern image data (a latent character string "COPY INHIBITED"), and an area surrounding the center area is assigned to second copy-forgery-inhibited-pattern image data (a latent character string "VOID"). Then, these pieces of copy-forgery-inhibited-pattern image data are combined with the original-document image data (blank image data) to generate an output document. FIG. 18 shows a copy of the output document.

Other than the foregoing exemplary compositing methods, an area of an original document image, having a size corresponding to the size of a latent image in each copy-forgery-inhibited pattern image, may be assigned to the copy-forgery-inhibited pattern image. This also applies to the third and fourth exemplary embodiments.

When the user B, who does not know that forced copy-forgery-inhibited pattern settings are configured, sends an instruction to combine PDL copy-forgery-inhibited-pattern image data with original-document image data, multiple pieces of copy-forgery-inhibited-pattern image data are combined with the original-document image data, as described above. Even when this is the case, an output document with which copy-forgery-inhibited pattern images that reflect the intentions of the user A and the user B are combined can be obtained using the methods disclosed in the second exemplary embodiment.

Third Exemplary Embodiment

In the second exemplary embodiment, the entire area of an original document image is divided into a plurality of areas, and the individual areas are assigned to multiple copy-forgery-inhibited pattern images. Then, the multiple copy-forgery-inhibited pattern images are combined with the original document image according to the area assignment. Thus, an output document with which copy-forgery-inhibited pattern images that reflect the intention of more than one user are combined can be obtained. However, when copy-forgery-inhibited pattern images that have different dither matrices or copy-forgery-inhibited pattern images that have individual patterns the phases of which are shifted from each other are adjacent to each other, the quality of an image may be deteriorated.

Figure 19:
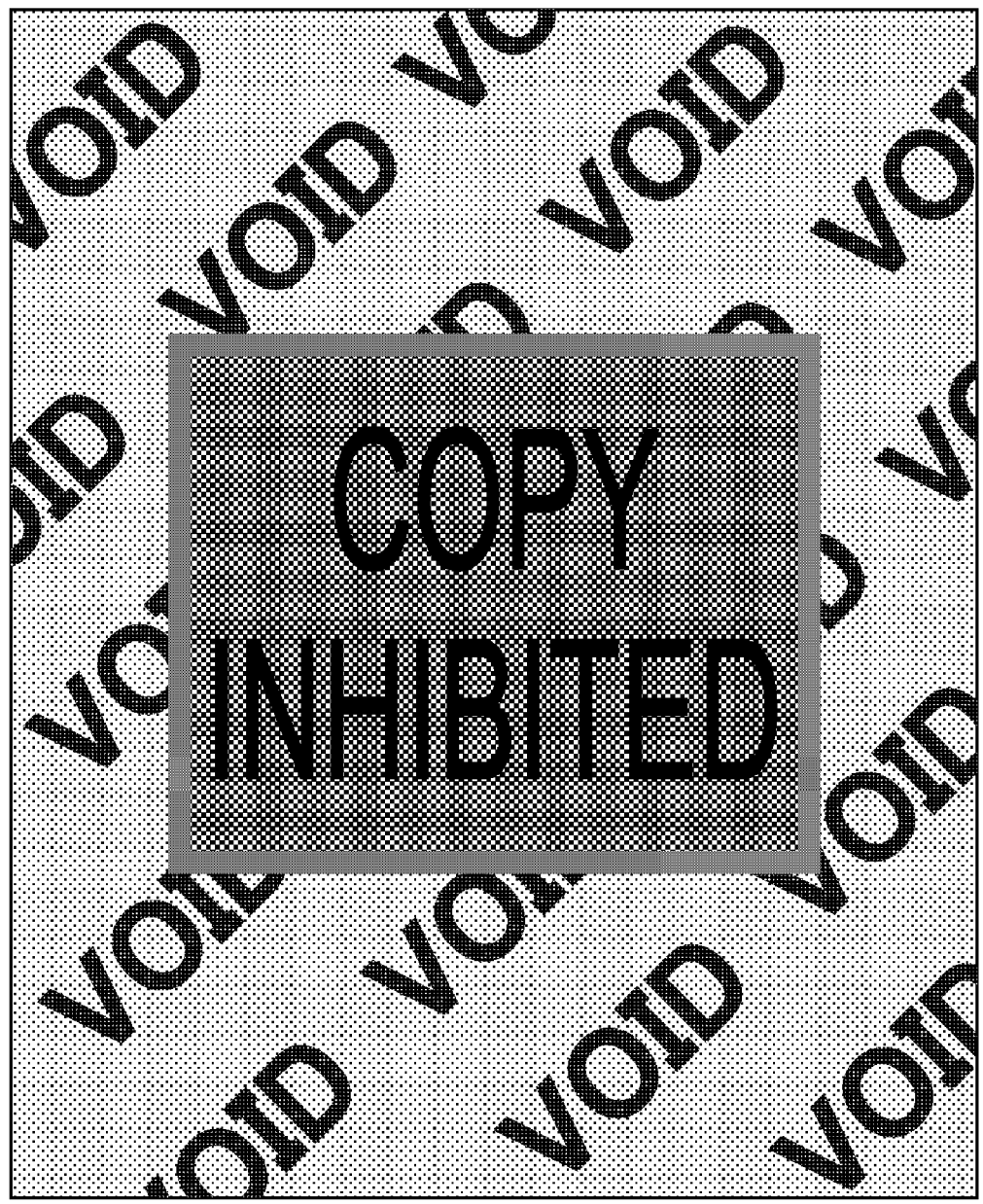
FIG. 19 shows an exemplary image in which interference occurs in boundaries between two copy-forgery-inhibited pattern areas.
Figure 20:
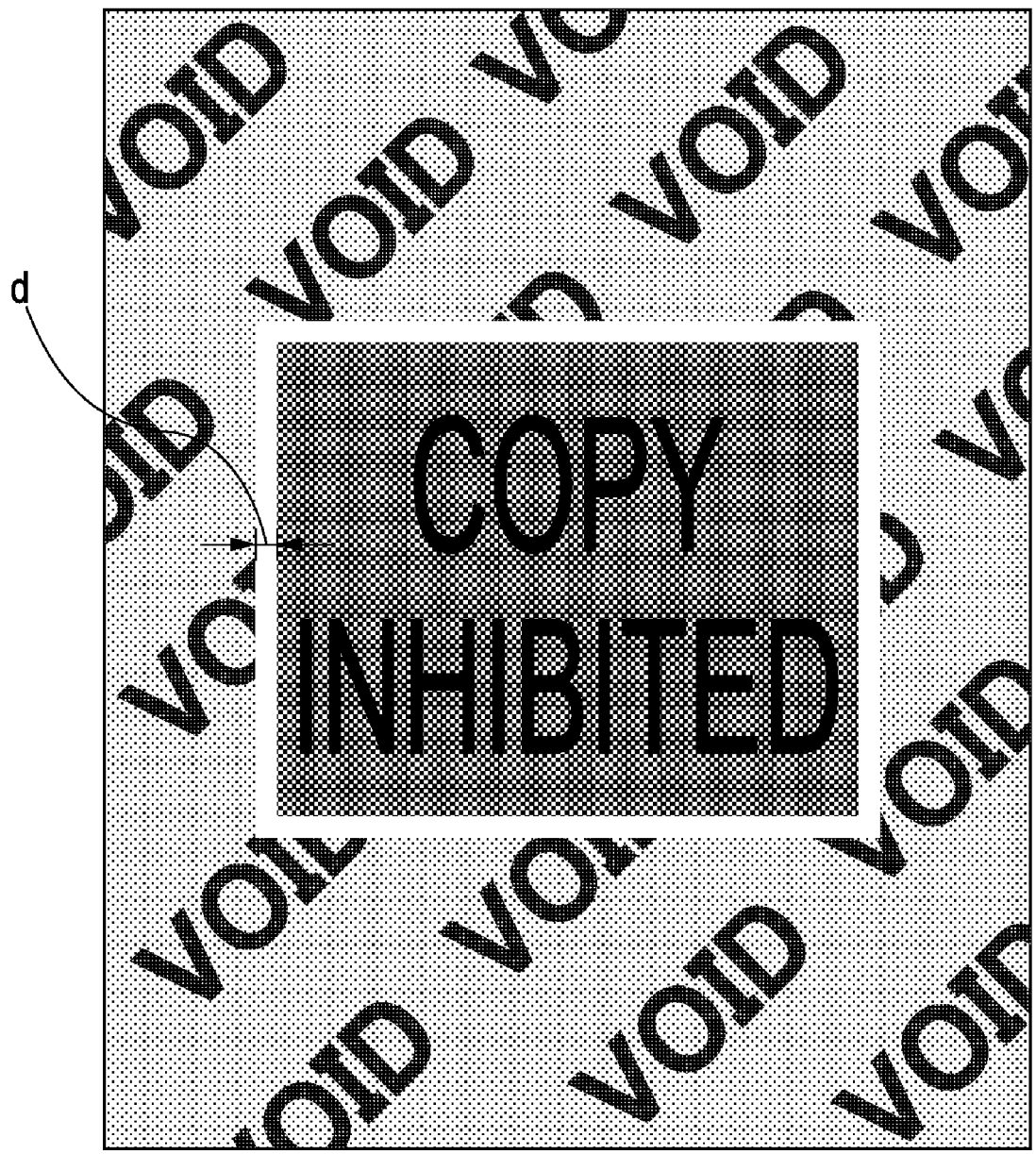
FIG. 20 shows an exemplary image in which gaps are left in boundaries between two copy-forgery-inhibited pattern areas.

FIG. 19 schematically shows a case where the quality of an image is deteriorated due to interference between patterns of multiple copy-forgery-inhibited pattern images in boundaries of the copy-forgery-inhibited pattern images. Thus, in the present exemplary embodiment, gaps of predetermined size specified by the number of pixels are provided between different copy-forgery-inhibited pattern images. FIG. 20 schematically shows copy-forgery-inhibited pattern images in a case where gaps d are provided in all boundaries between the copy-forgery-inhibited pattern images. For example, the initial size of the gaps d may be as large as three pixels, and the size of the gaps d may be automatically changed in the digital multi functional printer 1 so as to suit the characteristics of the printer section 300 and the like or specified by the user. In this case, when the size of the gaps d is too large, the user may think that the visibility of the copy-forgery-inhibited pattern images is impaired. Thus, practically, gaps of a size between the minimum size and the maximum size, which are appropriately predetermined, should be provided between different copy-forgery-inhibited pattern images.

The process in a third exemplary embodiment is shown in the flowchart in FIG. 16. The CPU 103 performs overall control of execution of steps in the flowchart. The RAM 107 functions as a main memory of the CPU 103, a work area, and the like. The steps in the flowchart are performed before image compositing is performed in the compositing unit 130.

The processes in steps S161, S162, and S163 are similar to those in the second exemplary embodiment, and the description of these steps is omitted here.

In step S164, special copy-forgery-inhibited pattern printing is performed, in which multiple copy-forgery-inhibited pattern images and an original document image are combined to output a composite image. When special copy-forgery-inhibited pattern printing according to the present exemplary embodiment is performed, the compositing unit 130 divides the entire area of an original document image into a plurality of areas and assigns the individual areas to multiple copy-forgery-inhibited pattern images. Then, gaps of predetermined size specified by the number of pixels are set between the individual areas. Then, the multiple copy-forgery-inhibited pattern images, to which the individual areas are assigned, and the original document image are combined to output a composite image.

In the third exemplary embodiment, an output document can be obtained, in which copy-forgery-inhibited pattern images that reflect the intention of more than one user are included and furthermore improved visibility is achieved by eliminating interference between the copy-forgery-inhibited pattern images.

Fourth Exemplary Embodiment

In the third exemplary embodiment, multiple copy-forgery-inhibited pattern images with gaps of predetermined size specified by the number of pixels therebetween are combined with an original document image. A fourth exemplary embodiment is the same as the third exemplary embodiment except in that gaps between multiple copy-forgery-inhibited pattern images are determined on the basis of a unit of processing in copy-forgery-inhibited pattern image generation.

A copy-forgery-inhibited pattern image is generated by using dither matrices of predetermined size and the like, as described above.

Figure 21:
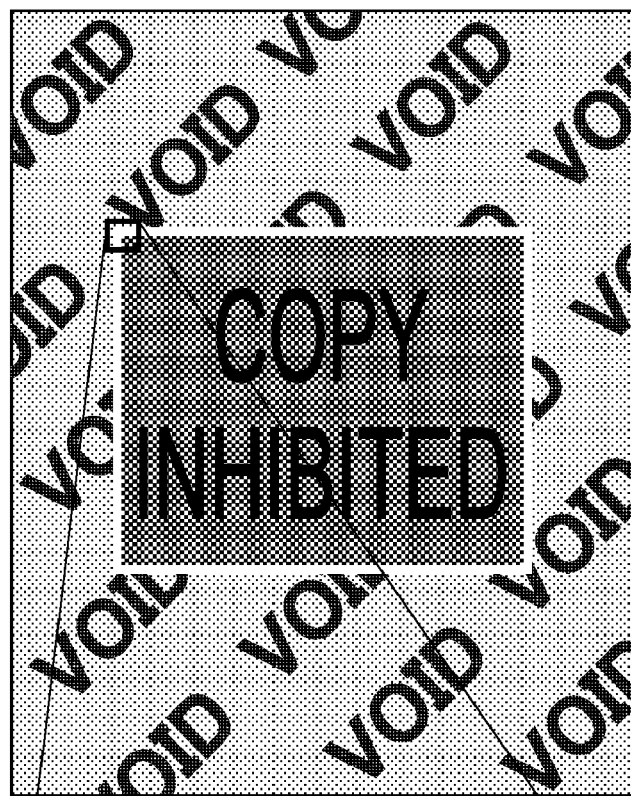
FIG. 21 shows an exemplary copy-forgery-inhibited pattern image in which the size of a copy-forgery-inhibited pattern area is an integral multiple of the size of a dither matrix.
Figure 21:
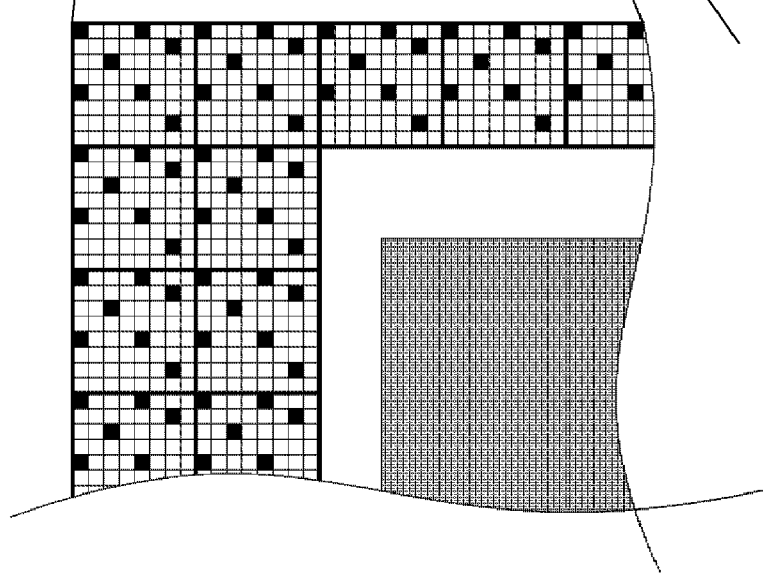

Part (a) of FIG. 21 shows a case where a second area of an original document image is assigned to a second copy-forgery-inhibited pattern image (a latent character string "VOID") with gaps between the second copy-forgery-inhibited pattern image and a first copy-forgery-inhibited pattern image (a latent character string "COPY INHIBITED") to which a first area of the original document image has been already assigned.

Part (b) of FIG. 21 shows an enlarged part of the image shown in part (a) of FIG. 21. Each area surrounded by bold lines, including eight by eight pixels, is a dither matrix for generating the second copy-forgery-inhibited pattern image. As is apparent from FIG. 21, the dither matrices for generating the second copy-forgery-inhibited pattern image are disposed as close to the first copy-forgery-inhibited pattern image as possible without contact with the first copy-forgery-inhibited pattern image. In this case, the second area (i.e., an area on dither matrices are disposed), with which the second copy-forgery-inhibited pattern image is combined, is controlled with a dither matrix being a unit of control. Thus, even when the shape of the first copy-forgery-inhibited pattern image is complicated, the second area can be readily determined. This reduces the amount of calculation. Consequently, an output document can be obtained in a short time, in which copy-forgery-inhibited pattern images that reflect the intention of more than one user are included and furthermore the visibility is improved by eliminating interference patterns between the copy-forgery-inhibited pattern images.

Figure 22:
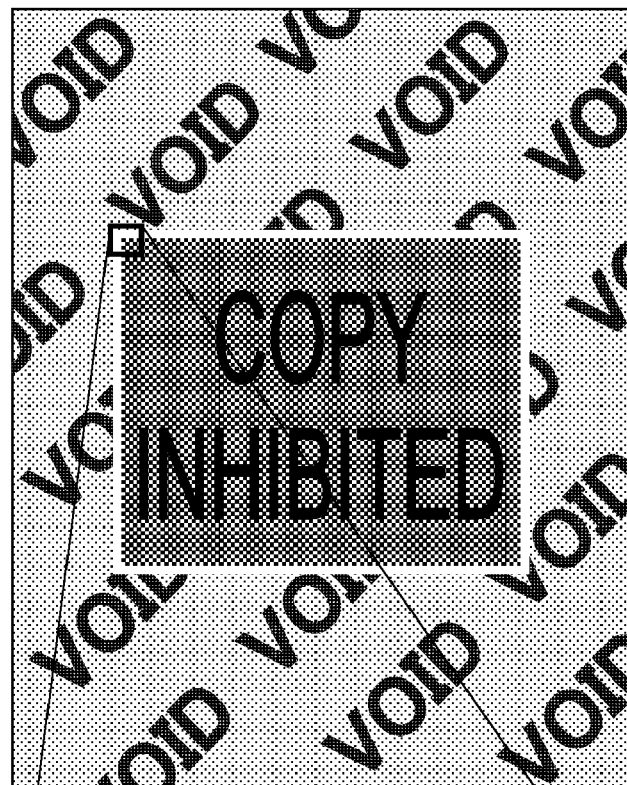
FIG. 22 shows an exemplary copy-forgery-inhibited pattern image in which the size of a copy-forgery-inhibited pattern area is an integral multiple of the size of a camouflage pattern.
Figure 22:
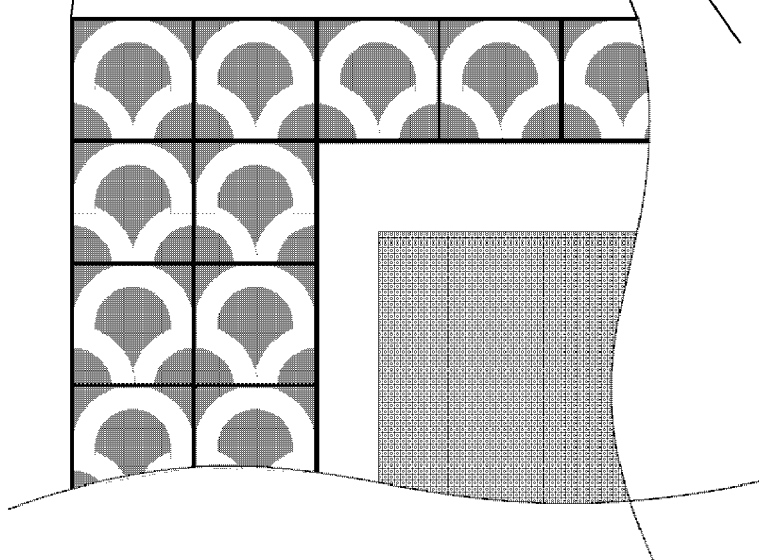

FIG. 22 shows a case where the aforementioned unit of control is a camouflage pattern.

Figure 23:
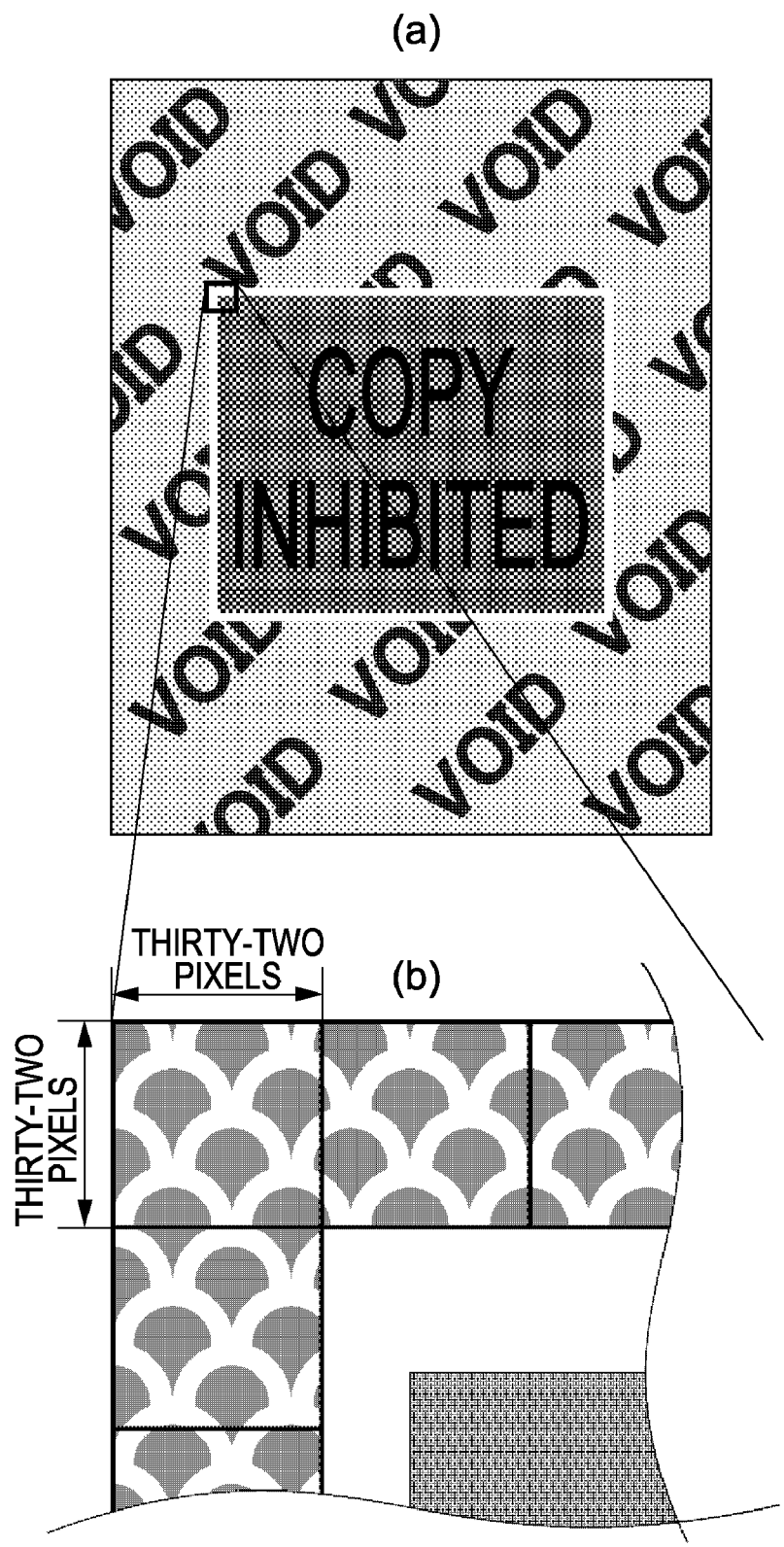
FIG. 23 shows an exemplary copy-forgery-inhibited pattern image in which the size of a copy-forgery-inhibited pattern area is an integral multiple of the size of a tile image.
Figure 24:
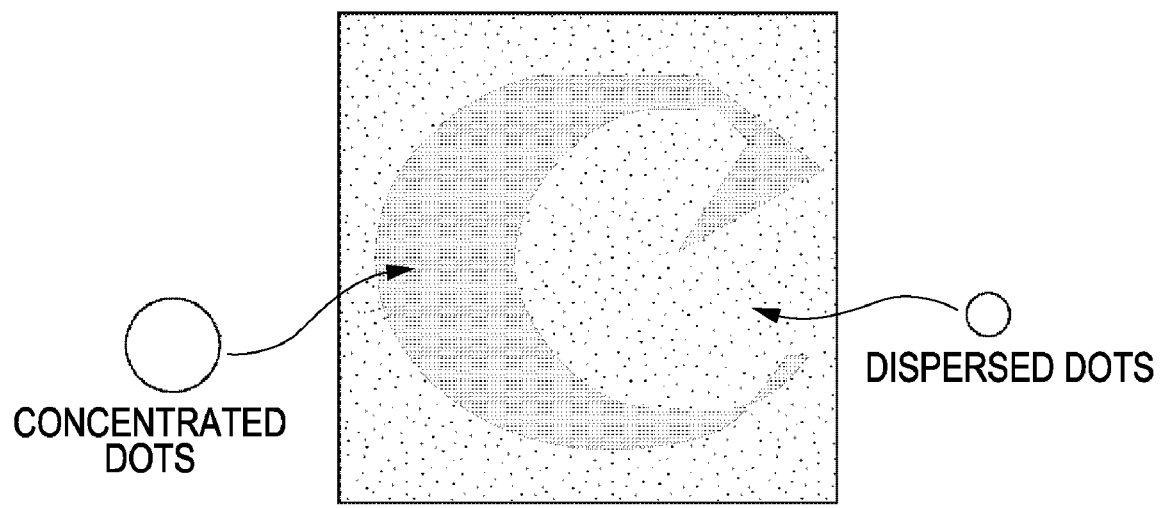
FIG. 24 is an illustration showing the state of dots in a copy-forgery-inhibited pattern image.
Figure 25:
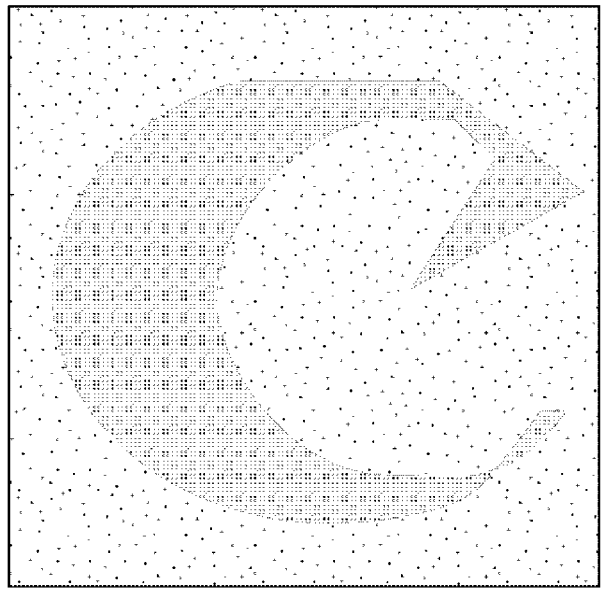
FIG. 25 shows a copy-forgery-inhibited pattern image having not been visualized and the copy-forgery-inhibited pattern image having been visualized on a copy.
Figure 25:
Figure 25:
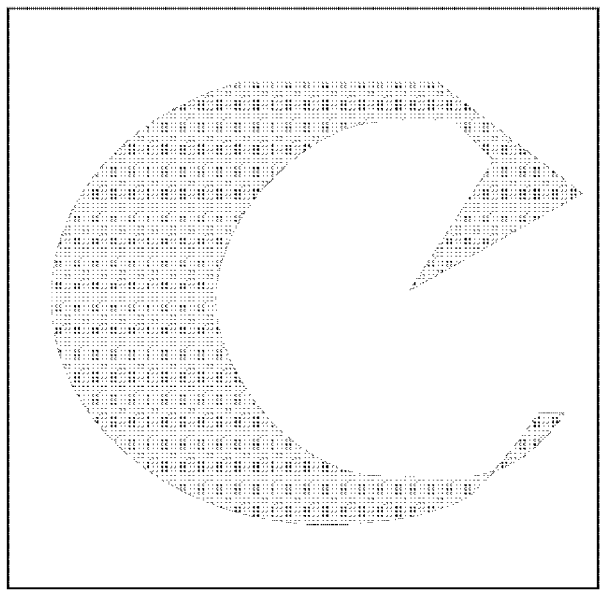

FIG. 23 shows a case where the aforementioned unit of control is a tile image that includes thirty-two by thirty-two pixels. Moreover, when the size of the dither matrix for generating the second copy-forgery-inhibited pattern image is set so as to be an integral multiple of the size of a tile image, a part of the second copy-forgery-inhibited pattern image with which the original document image is combined can be determined with the tile image being a unit of control.

Fifth Exemplary Embodiment

In the second to fourth exemplary embodiments, before multiple copy-forgery-inhibited pattern images and an original document image are combined, areas of the original document image are assigned to the multiple copy-forgery-inhibited pattern images. Then, the multiple copy-forgery-inhibited pattern images are combined with the original document image.

On the other hand, in a fifth exemplary embodiment, the digital multi functional printer 1 receives a composite image in which a part, not the whole, of an original document image has been already combined with a copy-forgery-inhibited pattern image. Then, the digital multi functional printer 1 combines another copy-forgery-inhibited pattern image with the received composite image.

Figure 26:
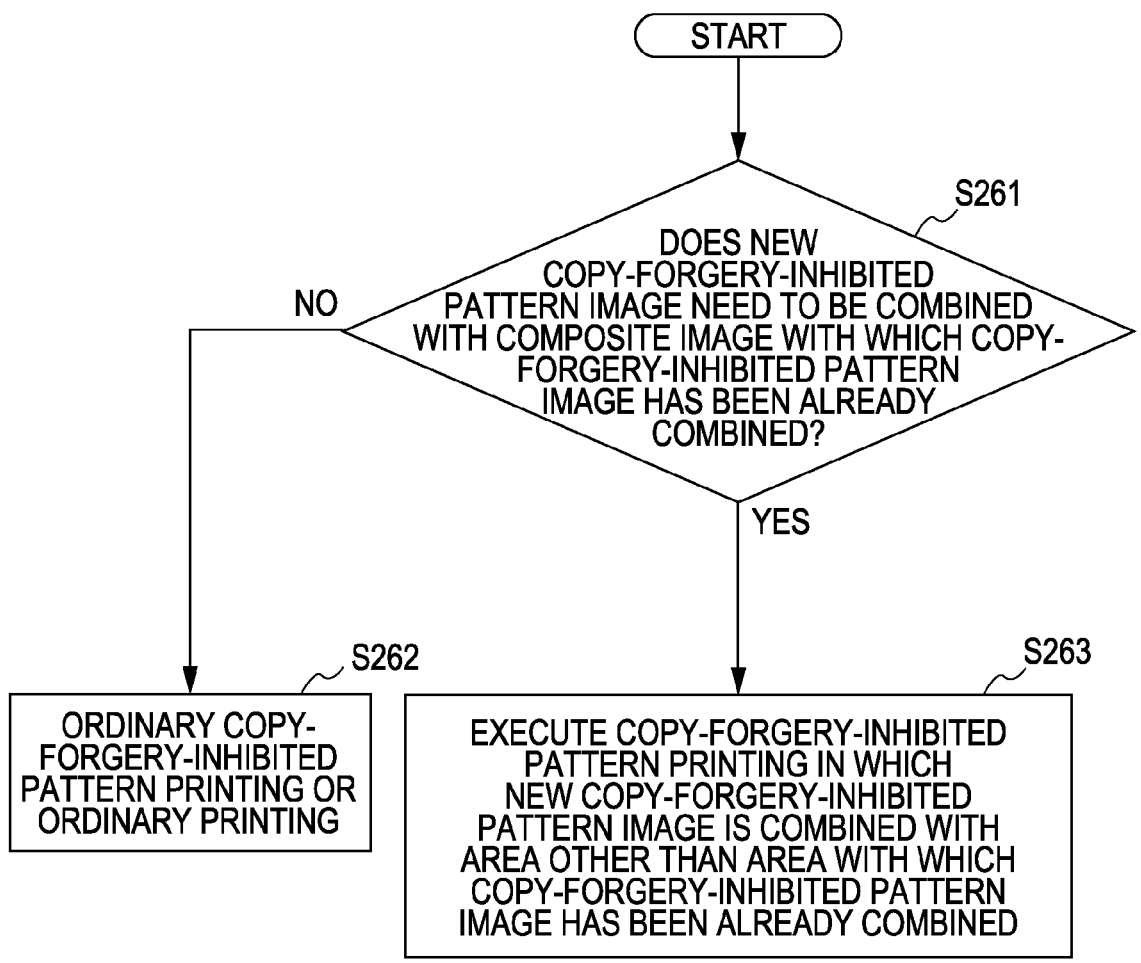
FIG. 26 is a flowchart showing the process of combining an original document image with which a copy-forgery-inhibited pattern image has been already combined with another copy-forgery-inhibited pattern image.

FIG. 26 is a flowchart showing the process in the fifth exemplary embodiment. The CPU 103 performs overall control of execution of steps in the flowchart. The RAM 107 functions as a main memory of the CPU 103, a work area, and the like. The steps in the flowchart are performed before image compositing is performed in the compositing unit 130.

In step S261, when a composite image is input to the compositing unit 130, it is determined whether a new copy-forgery-inhibited pattern image needs to be combined with the composite image. When it is determined that a new copy-forgery-inhibited pattern image needs to be combined with the composite image, the process proceeds to step S263. Otherwise, the process proceeds to step S262.

In step S262, ordinary printing or ordinary copy-forgery-inhibited pattern printing is performed, as in step S162 or S163.

In step S263, the compositing unit 130 combines the new copy-forgery-inhibited-pattern image with an area of the composite image other than the area with which another copy-forgery-inhibited pattern image has been already combined. The methods disclosed in the second to fourth exemplary embodiments may be used to combine the new copy-forgery-inhibited-pattern image with an area of the composite image other than the area with which another copy-forgery-inhibited pattern image has been already combined.

Sixth Exemplary Embodiment

In the second to fifth exemplary embodiments, a second copy-forgery-inhibited pattern image is combined with a second area of an original document image other than a first area of the original document image with which a first copy-forgery-inhibited pattern image is combined.

In this image compositing method, a part of a latent image included in the second copy-forgery-inhibited pattern image may be concealed by the first copy-forgery-inhibited pattern image. From FIGS. 17 to 23, it is seen that a part of a character string "VOID" is concealed.

Figure 27:
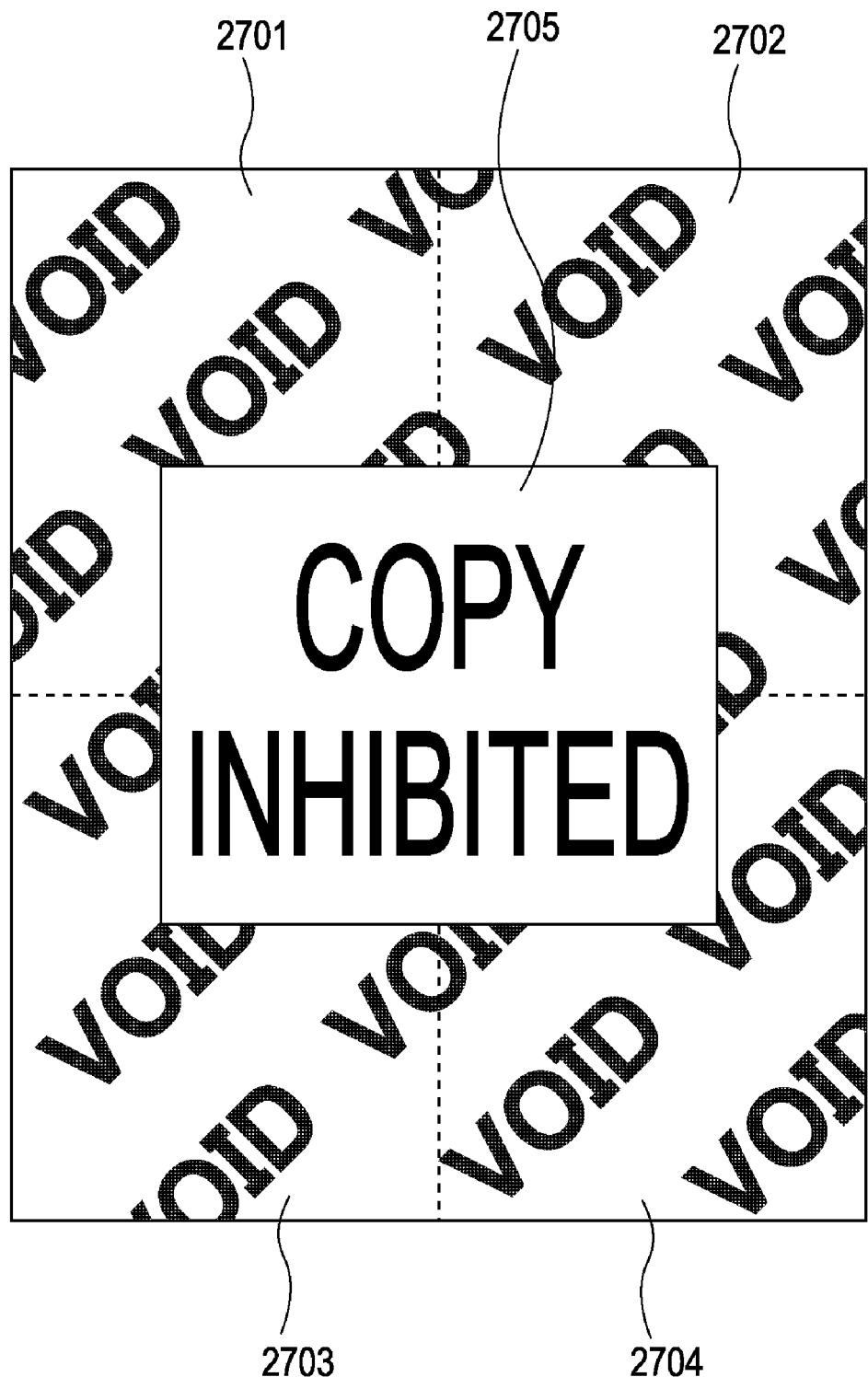
FIG. 27 shows an exemplary copy of an image to which two types of copy-forgery-inhibited pattern are added.

FIG. 27 shows four areas 2701, 2702, 2703, and 2704 into which the image shown in FIG. 18 is divided. From FIG. 27, it is seen that some character strings "VOID" in each of the areas 2701 to 2704 are concealed by an area (a first area) 2705.

Thus, in a sixth exemplary embodiment, a new copy-forgery-inhibited pattern image is generated so that latent images included in a second copy-forgery-inhibited pattern image are disposed within a second area of an original document image other than the first area of the original document image, with which a first copy-forgery-inhibited pattern image is combined. Then, the generated new copy-forgery-inhibited pattern image is combined with the original document image.

Figure 28:
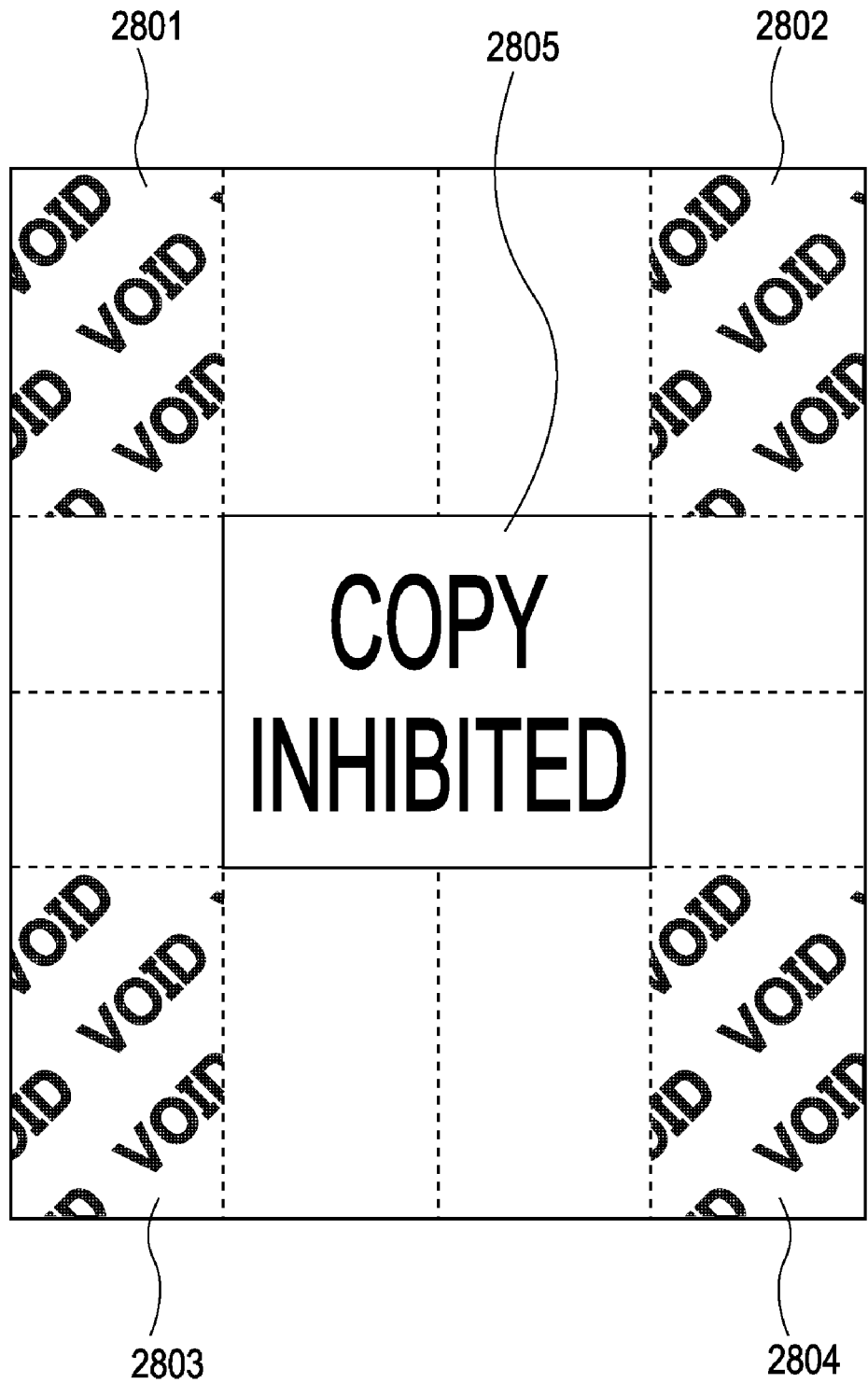
FIG. 28 shows an exemplary copy of an image to which two types of copy-forgery-inhibited pattern are added with the size of only one type being reduced.
Figure 29:
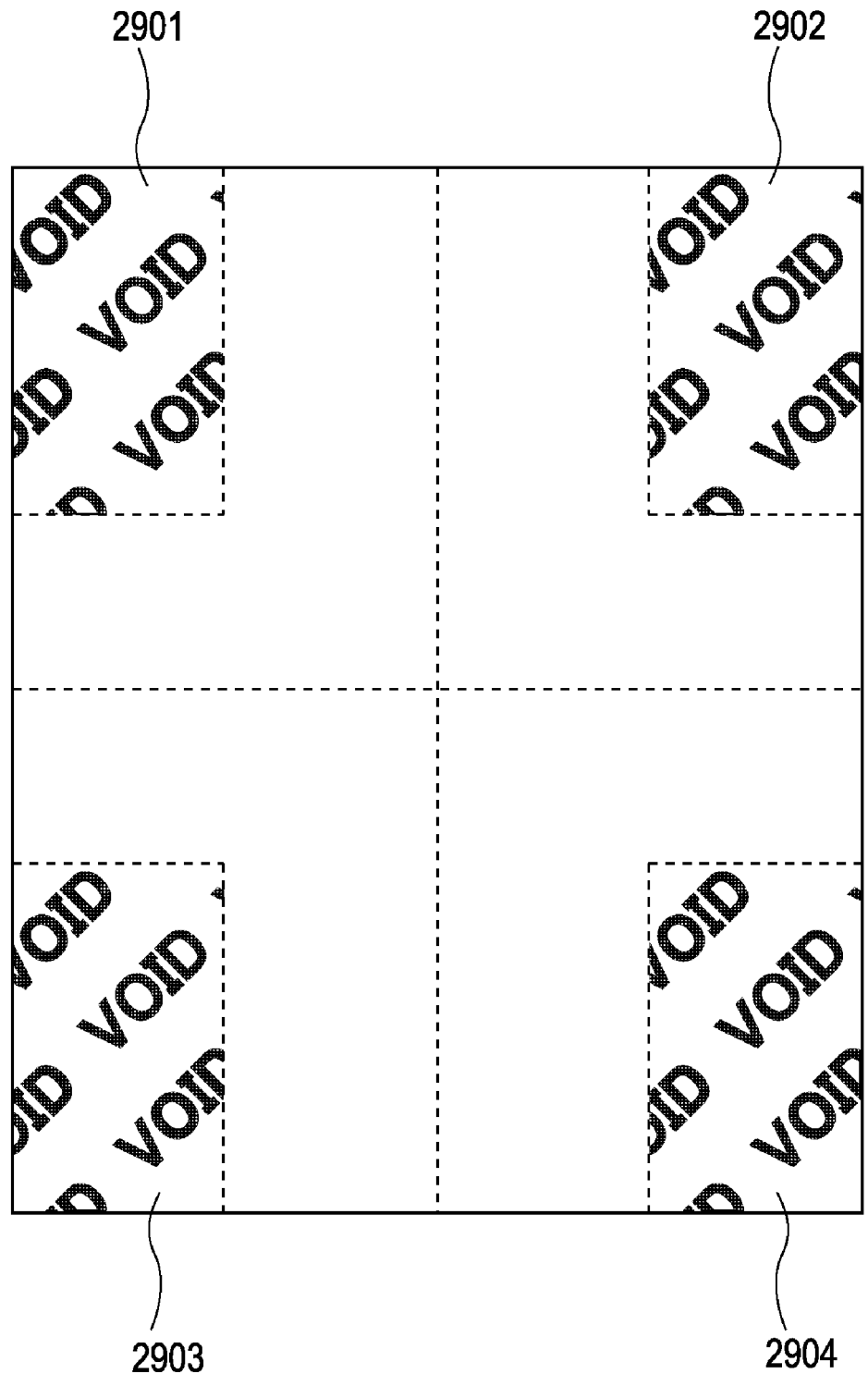
FIG. 29 shows an exemplary copy of an image to which a copy-forgery-inhibited pattern is added with the size of the copy-forgery-inhibited pattern being reduced.

Specifically, for example, the size of each of the areas 2701 to 2704, which are partially concealed by the first copy-forgery-inhibited pattern image, is reduced, as shown in FIG. 29, to generate a new copy-forgery-inhibited pattern image. FIG. 28 shows a composite image in which the new copy-forgery-inhibited pattern image (including character strings "VOID" of a reduce size), the first copy-forgery-inhibited pattern image, and the original document image (blank image data) are combined.

In the present exemplary embodiment, reduction in the size of a copy-forgery-inhibited pattern image (generation of a new copy-forgery-inhibited pattern image) is performed by the compositing unit 130. When the size of a copy-forgery-inhibited pattern image is reduced without a special arrangement to generate a new copy-forgery-inhibited pattern image, the size of dots in the latent-image part and the size of dots in the background-image part are both reduced. Then, the latent image is not visualized on a copy. Thus, when the size of a copy-forgery-inhibited pattern image is reduced, the sizes of only the latent-image pattern 702 and the background-image pattern 703, which are both bitmap data, in the copy-forgery-inhibited pattern image are reduced, and then the latent image and the background image (a new copy-forgery-inhibited pattern image) are generated from the patterns of reduced sizes, as disclosed in Japanese Patent Laid-Open No. 2005-198250.

In this way, an output document can be obtained, in which copy-forgery-inhibited pattern images that reflect the intention of more than one user and character strings specified by the users are included and furthermore the visibility is achieved by eliminating interference between the copy-forgery-inhibited pattern images.

Seventh Exemplary Embodiment

In the second to sixth exemplary embodiments, a second copy-forgery-inhibited pattern image is combined with a second area of an original document image other than a first area of the original document image with which a first copy-forgery-inhibited pattern image is combined.

In a seventh exemplary embodiment, when multiple copy-forgery-inhibited pattern images are set up, the setting of at least one of the copy-forgery-inhibited pattern images is changed so that the copy-forgery-inhibited pattern image is converted to a stamp image.

In this way, an output document can be obtained, in which copy-forgery-inhibited pattern images that reflect the intention of more than one user and character strings specified by the users are included and furthermore the visibility is achieved by eliminating interference between the copy-forgery-inhibited pattern images, as in the sixth exemplary embodiment.

Figure 30:
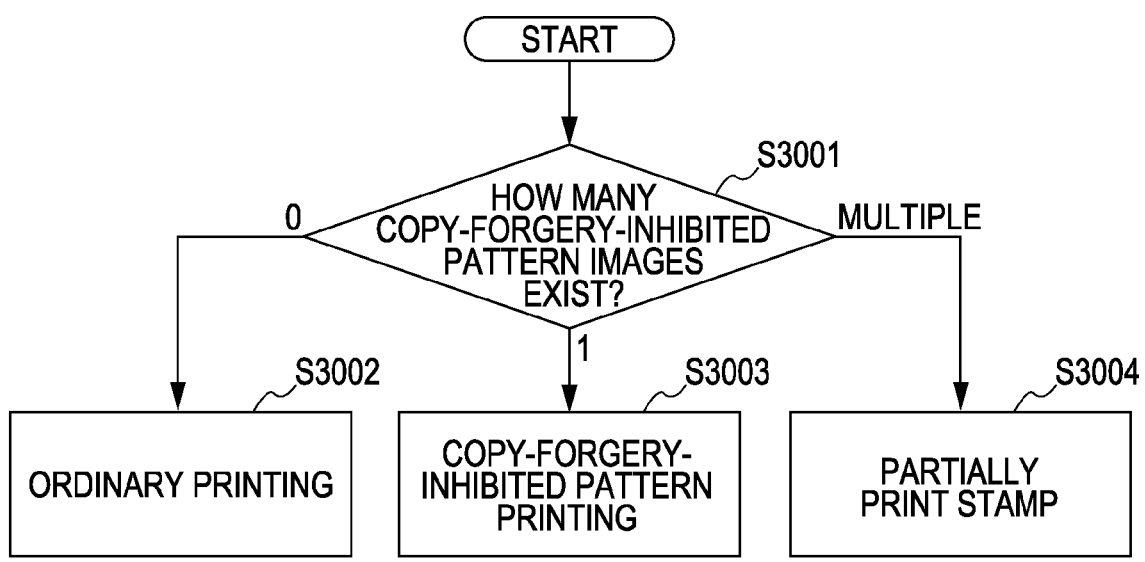
FIG. 30 is a flowchart showing the process in a seventh exemplary embodiment.

FIG. 30 is a flowchart showing the process in the seventh exemplary embodiment. The CPU 103 performs overall control of execution of steps in the flowchart. The RAM 107 functions as a main memory of the CPU 103, a work area, and the like. The steps in the flowchart are performed before image compositing is performed in the compositing unit 130.

The processes in steps S3001, S3002, and S3003 are similar to steps S161, S162, and S163, respectively, and the description of these steps is omitted here.

In step S3004, partial stamp printing is performed, in which at least one of multiple copy-forgery-inhibited pattern images is converted to a stamp image, and then the stamp image, remaining copy-forgery-inhibited pattern images, and an original document image are combined to output a composite image.

In the present exemplary embodiment, generation of a stamp image (generation of a new copy-forgery-inhibited pattern image) is performed by the compositing unit 130. When generation of a stamp image is performed, the latent-image pattern 702 and the background-image pattern 703, which are both bitmap data, in a second copy-forgery-inhibited pattern image are simply combined with an original document image and a first copy-forgery-inhibited pattern image.

Other Exemplary Embodiments

In the description of the image compositing methods in the first to sixth exemplary embodiments, it was not mentioned that color matching is performed when multiple copy-forgery-inhibited pattern images are combined. However, multiple copy-forgery-inhibited pattern images may be combined after color matching of the copy-forgery-inhibited pattern images is performed. In this case, the colors of the individual copy-forgery-inhibited pattern images should be changed before the copy-forgery-inhibited pattern images are combined. The colors of the individual copy-forgery-inhibited pattern images may be changed during a period between the time when the copy-forgery-inhibited pattern images are generated and the time when the copy-forgery-inhibited pattern images are combined. However, the present invention is not limited to this arrangement. Alternatively, when the color of a first copy-forgery-inhibited pattern image is determined before a second copy-forgery-inhibited pattern image is generated, the second copy-forgery-inhibited pattern image may be generated so that the color of the second copy-forgery-inhibited pattern image is the same as the color of the first copy-forgery-inhibited pattern image.

The present invention may be applied to a system that includes a plurality of devices (a computer, an interface device, a reader, a printer, and the like) or an apparatus (a copying machine, a printer, a facsimile machine, or the like) that comprises a single device.

The present invention is also achieved by an embodiment in which a computer (or a CPU or a micro processing unit (MPU)) included in a system or an apparatus reads and executes program code that is stored in a storage medium and performs the processes in the flowcharts shown in the aforementioned exemplary embodiments. In this case, the program code read from the storage medium performs the functions according to the aforementioned exemplary embodiments, and thus the present invention includes the program code and the storage medium, which stores the program code.

The following media can be used as storage media that are used to supply the program code: for example, a floppy disk, a hard disk, an optical disk, a magneto-optical disk, a compact disk read only memory (CD-ROM), a compact disk recordable (CD-R), a magnetic tape, a nonvolatile memory card, and a ROM. The present invention also includes the computer-readable storage medium, which stores the program code.

Furthermore, an operating system (OS) operating on a computer may execute some or all of the actual processing to perform the functions of the aforementioned exemplary embodiments according to instructions from the program code.

Furthermore, the program code read from the storage medium may be written to a memory included in, for example, a function expansion board inserted in a computer or a function expansion unit connected to a computer. Then, for example, a CPU included in the function expansion board, the function expansion unit, or the like may execute some or all of the actual processing to perform the functions of the aforementioned exemplary embodiments according to instructions from the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-360652 filed Dec. 14, 2005, which is hereby incorporated by reference herein in its entirety.

What is claimed is:

1. A method for controlling an image processing apparatus, the method comprising:
   a determining step of determining, on the basis of a given first area in an original document image, a second area in the original document image that does not overlap with the first area,
   wherein the second area is determined so that a gap of one or more pixels is left between the first area and the second area; and
   a compositing step of combining a first copy-forgery-inhibited pattern image with the first area and combining a second copy-forgery-inhibited pattern image with the second area,
   wherein the second copy-forgery-inhibited pattern image is generated using a dither matrix, and the size of the gap is less than the first number of pixels that is the number of rows or columns of the dither matrix.

2. A method for controlling an image processing apparatus, the method comprising:
   a determining step of determining, on the basis of a given first area in an original document image, a second area in the original document image that does not overlap with the first area; and
   a compositing step of combining a first copy-forgery-inhibited pattern image with the first area and combining a second copy-forgery-inhibited pattern image with the second area,
   wherein in the compositing step, an image corresponding to the second area is cut out from the second copy-forgery-inhibited pattern image, and the cut-out image is combined with the second area of the original document image.

3. A method for controlling an image processing apparatus, the method comprising:
   a determining step of determining, on the basis of a given first area in an original document image, a second area in the original document image that does not overlap with the first area; and
   a compositing step of combining a first copy-forgery-inhibited pattern image with the first area and combining a second copy-forgery-inhibited pattern image with the second area,
   wherein in the compositing step, the color of the second copy-forgery-inhibited pattern image is changed so that the color of the second copy-forgery-inhibited pattern image is approximately the same as the color of the first copy-forgery-inhibited pattern image before the second copy-forgery-inhibited pattern image is combined with the second area.

4. An image processing apparatus comprising:
   a determining unit that determines, on the basis of a given first area in an original document image, a second area in the original document image that does not overlap with the first area,
   wherein the determining unit determines the second area so that a gap of one or more pixels is left between the first area and the second area; and
   a compositing unit that combines a first copy-forgery-inhibited pattern image with the first area and combines a second copy-forgery-inhibited pattern image with the second area,
   wherein the second copy-forgery-inhibited pattern image is generated by generating means using a dither matrix, and the size of the gap is less than the first number of pixels that is the number of rows or columns of the dither matrix.

5. An image processing apparatus comprising:
   a determining unit that determines, on the basis of a given first area in an original document image, a second area in the original document image that does not overlap with the first area; and
   a compositing unit that combines a first copy-forgery-inhibited pattern image with the first area and combines a second copy-forgery-inhibited pattern image with the second area,
   wherein the compositing unit cuts out an image corresponding to the second area from the second copy-forgery-inhibited pattern image and combines the cut-out image with the second area of the original document image.

6. An image processing apparatus comprising:
   a determining unit that determines, on the basis of a given first area in an original document image, a second area in the original document image that does not overlap with the first area; and
   a compositing unit that combines a first copy-forgery-inhibited pattern image with the first area and combines a second copy-forgery-inhibited pattern image with the second area,
   wherein the compositing unit includes a color matching unit which changes the color of the second copy-forgery-inhibited pattern image so that the color of the second copy-forgery-inhibited pattern image is approximately the same as a color of the first copy-forgery-inhibited pattern image before combining the second copy-forgery-inhibited pattern image with the second area.

* * * * *